United States Patent
Watanabe et al.

(10) Patent No.: US 11,099,507 B2
(45) Date of Patent: Aug. 24, 2021

(54) SHEET SEPARATION DEVICE, LAMINATOR, IMAGE FORMING APPARATUS, AND IMAGE FORMING SYSTEM

(71) Applicants: Takahiro Watanabe, Kanagawa (JP); Tomohiro Furuhashi, Kanagawa (JP); Michitaka Suzuki, Kanagawa (JP); Tomomichi Hoshino, Kanagawa (JP); Wataru Takahashi, Tokyo (JP); Fumiharu Yoneyama, Kanagawa (JP); Kazuyoshi Matsuo, Kanagawa (JP); Makoto Hidaka, Tokyo (JP); Koki Sakano, Kanagawa (JP); Akira Kunieda, Tokyo (JP); Takuya Morinaga, Tokyo (JP); Yohsuke Haraguchi, Kanagawa (JP)

(72) Inventors: Takahiro Watanabe, Kanagawa (JP); Tomohiro Furuhashi, Kanagawa (JP); Michitaka Suzuki, Kanagawa (JP); Tomomichi Hoshino, Kanagawa (JP); Wataru Takahashi, Tokyo (JP); Fumiharu Yoneyama, Kanagawa (JP); Kazuyoshi Matsuo, Kanagawa (JP); Makoto Hidaka, Tokyo (JP); Koki Sakano, Kanagawa (JP); Akira Kunieda, Tokyo (JP); Takuya Morinaga, Tokyo (JP); Yohsuke Haraguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/842,897

(22) Filed: Apr. 8, 2020

(65) Prior Publication Data
US 2020/0341414 A1 Oct. 29, 2020

(30) Foreign Application Priority Data
Apr. 25, 2019 (JP) .............................. JP2019-083903

(51) Int. Cl.
G03G 15/20 (2006.01)
B32B 43/00 (2006.01)
B32B 37/00 (2006.01)

(52) U.S. Cl.
CPC ..... G03G 15/2028 (2013.01); B32B 37/0046 (2013.01); B32B 43/006 (2013.01); *B32B 2037/0061* (2013.01)

(58) Field of Classification Search
USPC ........................................................ 399/323
See application file for complete search history.

(56) References Cited

U.S. PATENT DOCUMENTS

| | | | | |
|---|---|---|---|---|
| 5,217,561 A | * | 6/1993 | Ueda ..................... | B32B 37/226 156/359 |
| 6,893,521 B2 | * | 5/2005 | Sasaki ................... | B32B 37/182 156/354 |

(Continued)

FOREIGN PATENT DOCUMENTS

| | | | | |
|---|---|---|---|---|
| JP | 03120546 A | * | 5/1991 | ............. G03B 27/32 |
| JP | 2006-160429 | | 6/2006 | |

OTHER PUBLICATIONS

U.S. Appl. No. 16/747,225, filed Jan. 20, 2020, Tomohiro Furuhashi, et al.

(Continued)

*Primary Examiner* — Q Grainger
(74) *Attorney, Agent, or Firm* — Harness, Dickey & Pierce, P.L.C.

(57) ABSTRACT

A sheet separation device configured to separate a two-ply sheet, in which two sheets are bonded together at a portion, includes a rotator, a nipping member disposed opposite the (Continued)

rotator and configured to nip the two-ply sheet with the rotator, a conveyor configured to convey the two-ply sheet between the rotator and the nipping member, and a winding member disposed adjacent to the rotator. The conveyor conveys the two-ply sheet with a bonded portion of the two-ply sheet being an upstream end or a downstream end of the two-ply sheet in a conveyance direction of the two-ply sheet. The winding member winds the two-ply sheet around the rotator, to create a difference in winding circumferential length between the two sheets and separate the two sheets. The sheet separation device further includes control circuitry configured to adjust a winding amount of the two-ply sheet around the rotator.

20 Claims, 24 Drawing Sheets

(56) References Cited

U.S. PATENT DOCUMENTS

| | | | |
|---|---|---|---|
| 2011/0073234 A1* | 3/2011 | Lee | B32B 41/00 |
| | | | 156/60 |
| 2017/0021603 A1* | 1/2017 | Kikuchi | B32B 37/182 |
| 2017/0341885 A1 | 11/2017 | Suzuki et al. | |
| 2018/0259895 A1 | 9/2018 | Shibasaki et al. | |
| 2019/0284012 A1 | 9/2019 | Yoneyama et al. | |
| 2020/0247636 A1* | 8/2020 | Furuhashi | B65H 45/04 |

OTHER PUBLICATIONS

U.S. Appl. No. 16/745,653, filed Jan. 17, 2020, Takuya Morinaga, et al.

* cited by examiner

FIG. 21A
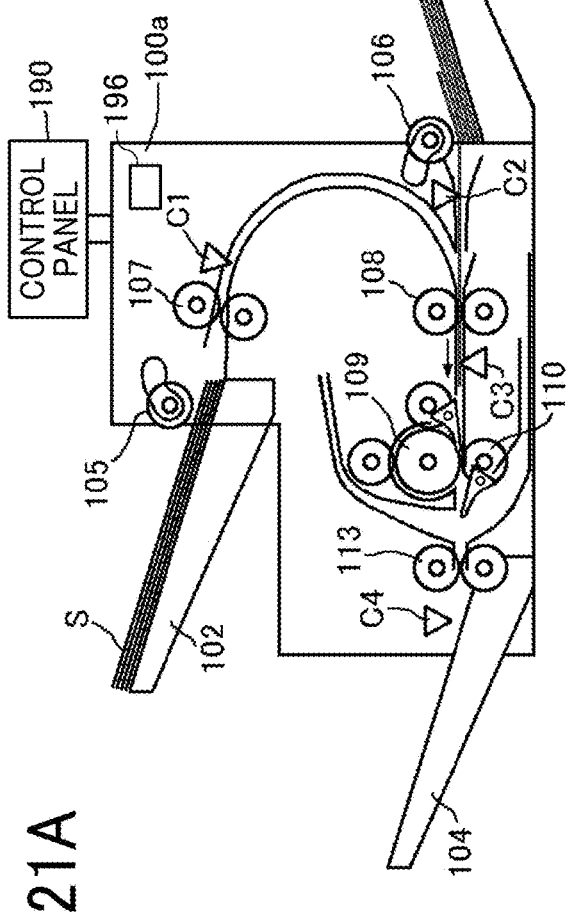
FIG. 21B
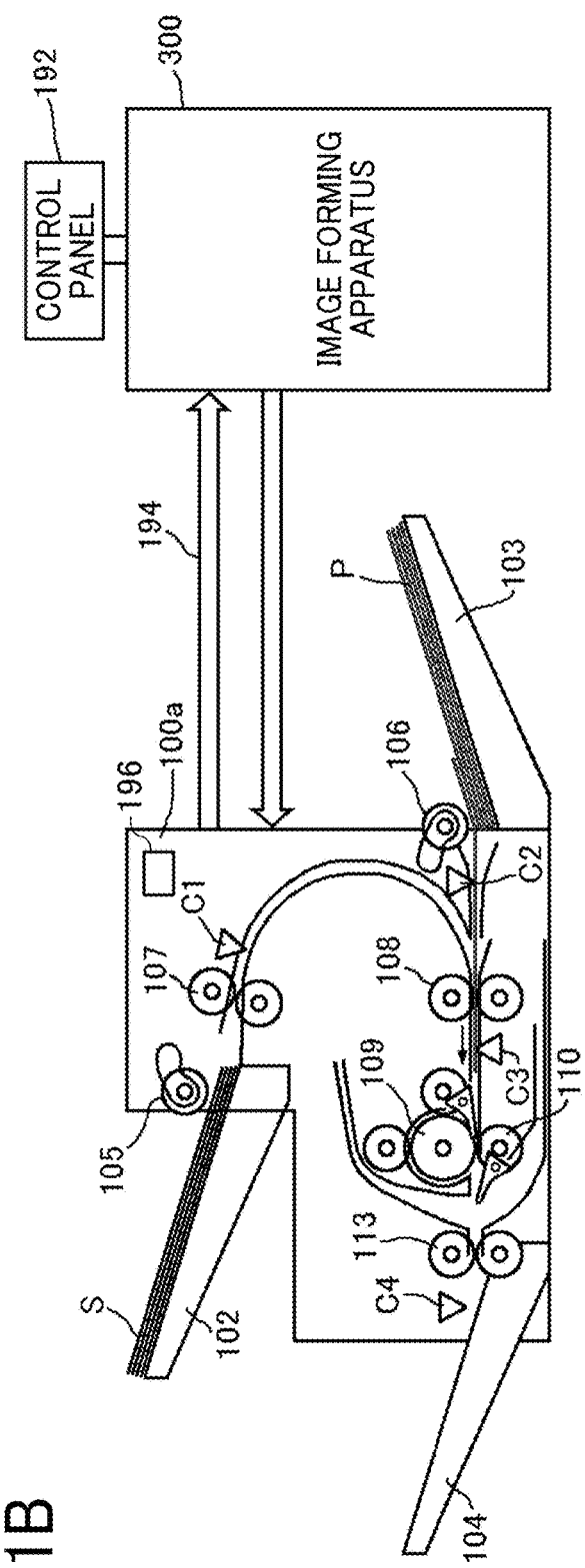
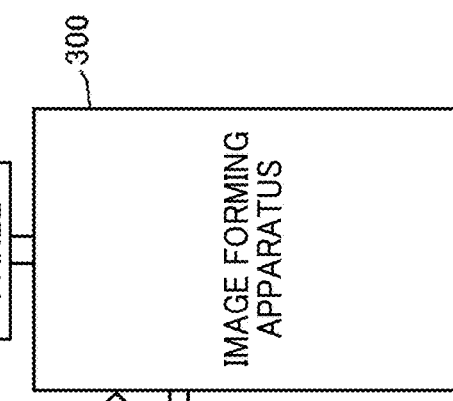

SHEET SEPARATION DEVICE, LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2019-083903, filed on Apr. 25, 2019, in the Japan Patent Office, the entire disclosure of which is hereby incorporated by reference herein.

BACKGROUND

Technical Field

This disclosure relates to a sheet separation device, a laminator, an image forming apparatus, and an image forming system.

Related Art

There is known a lamination technique of inserting an insertion sheet (paper, photo, etc.) between a two-ply laminate sheet or laminate film (e.g., a lamination pouch or lamination folder) in which two sheets are bound (sealed) on one side as if one sheet is folded. The two-ply laminate sheet is bonded, with the insertion sheet sandwiched therebetween, with heat and pressure.

In a conventional laminating process, a user manually inserts the insertion sheet in the two-ply sheet and then bonds the laminate sheet using a lamination machine (hereinafter simply "laminator").

However, there is an adhesive layer on the inside of the two-ply laminate sheet that tends to resist separation, thereby requiring that the user separates the two sides of the laminate sheet by hand. Another bother is accurately positioning the insertion sheet after the laminate sheet is opened. Further, the laminating process by the laminator takes about 30 to 60 seconds, and the user has to wait for the process to finish.

Thus, the user has to repeat, for the number of required sheets, such steps as: (1) inserting the sheet inside the laminate sheet and setting the laminate sheet in the laminator; and (2) inserting another insertion sheet inside another laminate sheet while the laminator operates. Therefore, even in the case of laminating some several tens of sheets, the user has to stay at the laminator for a long time, and manpower for repeating the above operation is required.

SUMMARY

An embodiment of this disclosure provides a sheet separation device configured to separate a two-ply sheet in which two sheets are bonded together at a portion of the two-ply sheet. The sheet separation device includes a rotator, a nipping member disposed opposite the rotator and configured to nip the two-ply sheet with the rotator, a conveyor configured to convey the two-ply sheet between the rotator and the nipping member, and a winding member disposed adjacent to the rotator. The conveyor conveys the two-ply sheet with a bonded portion of the two-ply sheet being an upstream end or a downstream end of the two-ply sheet in a conveyance direction of the two-ply sheet. The winding member winds the two-ply sheet around the rotator, to create a difference in winding circumferential length between the two sheets and separate the two sheets. The sheet separation device further includes control circuitry configured to adjust a winding amount of the two-ply sheet around the rotator.

Another embodiment provides a sheet separation device that includes a rotator including a holder configured to hold the two-ply sheet. The holder is configured to wind the two-ply sheet around the rotator as the rotator rotates, to create a difference in winding circumferential length between the two sheets and separate the two sheets. The sheet separation device includes a conveyor configured to convey the two-ply sheet to the holder and the above-described control circuitry. The conveyor conveys the two-ply sheet with a bonded portion of the two-ply sheet being an upstream end or a downstream end of the two-ply sheet in a conveyance direction of the two-ply sheet.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 21A and 21B are schematic views illustrating examples of a general arrangement of a sheet separation device according to a first embodiment of the present disclosure;

Figure 1:
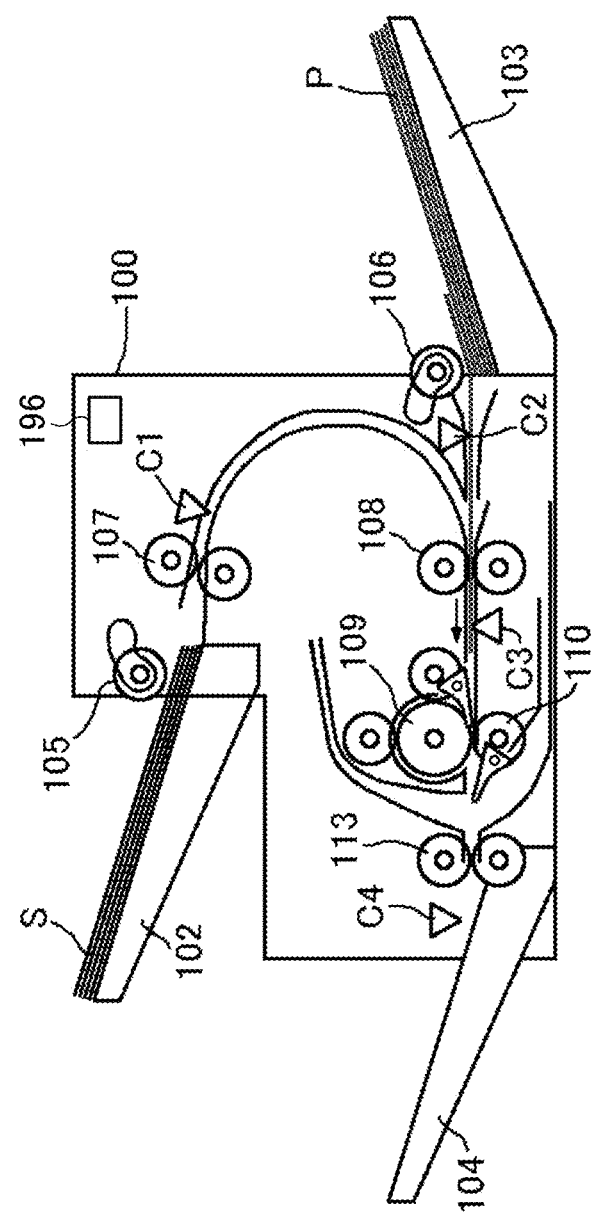
FIG. 1 is a schematic view illustrating a general arrangement of a sheet separation device according to one embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, embodiments of this disclosure are described. As used herein, the singular forms "a," "an," and "the" are intended to include the plural forms as well, unless the context clearly indicates otherwise.

The sheet separation devices according to embodiments of this disclosure is to separate two sheets of a two-ply sheet (hereinafter referred to as a lamination sheet S) and to insert and sandwich an insertion sheet P between the separated sheets of the two-ply sheet.

The lamination sheet S is a two-ply sheet constructed of two overlapping sheets and bonded (or joined) at one portion (or on one side).

For example, there is a two-ply sheet in which a first side is a transparent sheet such as a transparent polyester sheet and the opposite side is a transparent or opaque sheet and bonded to the other sheet on one side thereof.

The insertion sheet P is an example of a sheet medium that is inserted in the two-ply sheet and can be plain paper, thick paper, postcards, envelopes, thin paper, coated paper (art paper, etc.), tracing paper, overhead projector (OHP) transparencies, and the like.

In the present specification, "separating the lamination sheet S" and "opening the two-ply lamination sheet S" signify peeling one of the two-sheets of the two-ply lamination sheet S from the other.

FIG. 1 is a schematic view illustrating a general arrangement of a sheet separation device according to one embodiment of the present disclosure. As illustrated in FIG. 1, a sheet separation device 100 includes a sheet tray 102 that is a first stacking tray on which the lamination sheets S are stacked, a pickup roller 105 that feeds the lamination sheet S from the sheet tray 102, and a conveyance roller pair 107. The sheet separation device 100 further includes a sheet feeding tray 103 that is a second stacking tray on which the insertion sheets P are stacked, and a pickup roller 106 that feeds the insertion sheets P from the sheet feeding tray 103.

A sheet sensor C1 to detect the position of the lamination sheet S being conveyed is disposed downstream from the conveyance roller pair 107 in a conveyance direction of the lamination sheet S. A sheet sensor C2 to detect the position of the insertion sheet P being conveyed is disposed downstream from the pickup roller 106 in a conveyance direction of the insertion sheet P.

The sheet separation device 100 further includes an entrance roller pair 108, a winding roller 109 as a rotator, a driven roller 110 as a nipping member described later, an exit roller pair 113, an output tray 104, and the like, downstream from the conveyance roller pair 107 and the pickup roller 106 in the conveyance direction of the lamination sheet S and the insertion sheet P. The winding roller 109 and the driven roller 110 are paired as a roller pair. A sheet sensor C3 to detect the position of the lamination sheet S and the insertion sheet P being conveyed is disposed downstream from the entrance roller pair 108 in the conveyance direction. A sheet sensor C4 to detect the position of the lamination sheet S being conveyed is disposed downstream from the exit roller pair 113 in the conveyance direction.

The pickup roller 105, the conveyance roller pair 107, the entrance roller pair 108, and the roller pair constructed of the winding roller 109 and the driven roller 110 are examples of a first feeder to feed a two-ply sheet. The pickup roller 106, the entrance roller pair 108, and the roller pair constructed of the winding roller 109 and the driven roller 110 are examples of a second feeder. The sheet separation device 100 further includes a controller 196 including a central processing unit (CPU) and the like. The controller 196 controls the operation of the sheet separation device 100 and performs determination and the like described later.

As illustrated in FIG. 1, in the sheet separation device 100 according to the present embodiment, the lamination sheets S and the insertion sheets P are stacked on separate trays and fed between the roller pair constructed of the winding roller 109 and the driven roller 110 and further to the exit roller pair 113. As will be described later, in a state where the lamination sheet S is between the exit roller pair 113 and the roller pair constructed of the winding roller 109 and the driven roller 110, the insertion sheet P is inserted into the two-ply lamination sheet S being opened. Then, the exit roller pair 113 ejects and stacks the lamination sheet S, in which the insertion sheet P is inserted, onto the output tray 104. The configuration and operation thereof are described in detail below.

Figure 2:
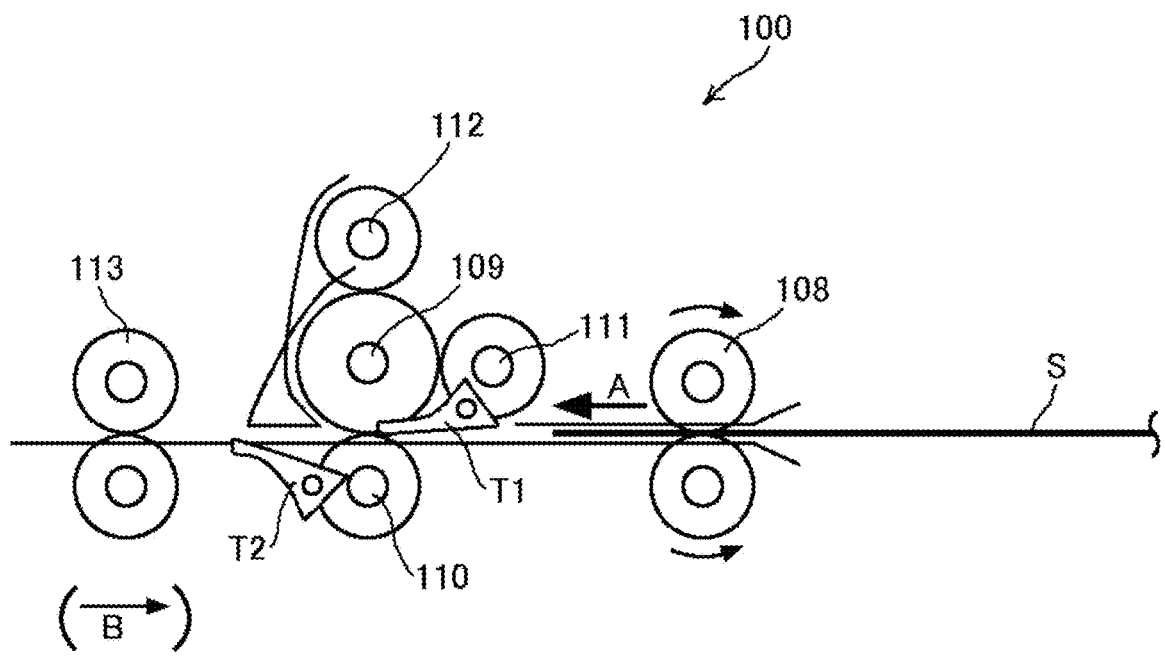
FIG. 2 is a view of a main part of the sheet separation device illustrated in FIG. 1.

FIG. 2 is a view illustrating a main part of the sheet separation device illustrated in FIG. 1. As illustrated in FIG. 2, the sheet separation device 100 includes the exit roller pair 113 serving as a conveyor. The exit roller pair 113 conveys the lamination sheet S between the roller pair of the winding roller 109 and the driven roller 110.

Each of the entrance roller pair 108 and the exit roller pair 113 is, for example, two rollers paired with each other. Driven by a driver (a motor or the like), the entrance roller pair 108 rotates in one direction, whereas the exit roller pair 113 rotates in forward and reverse directions, thereby nipping and conveying the lamination sheet S and the insertion sheet P.

The entrance roller pair 108 conveys the lamination sheet S and the insertion sheet P toward the exit roller pair 113. The conveyance direction indicated by arrow A is referred to as a forward conveyance direction or direction A.

By contrast, the exit roller pair 113 can switch the direction of rotation between the forward direction and the reverse direction. The exit roller pair 113 can convey the nipped lamination sheet S in the forward conveyance direction toward the output tray 104 (see FIG. 1) and the reverse direction in which the lamination sheet S is drawn back toward the winding roller 109. The conveyance direction toward the winding roller 109 (the direction indicated by arrow B and reverse to the forward conveyance direction) is referred to as the reverse conveyance direction or direction B.

Between the entrance roller pair 108 and the exit roller pair 113, the sheet separation device 100 further includes the winding roller 109 that is the rotator and the driven roller 110 that is the nipping member. The driven roller 110 rotates with the winding roller 109.

Driven by a driver (motor or the like), the winding roller 109 rotates in the forward and reverse directions, and the direction of rotation can be switched between the forward direction and the reverse direction (clockwise and counterclockwise). The driven roller 110 is in contact with the winding roller 109, forming a nip therewith. The winding roller 109 and the driven roller 110 nip and convey the lamination sheet S and the insertion sheet P.

The sheet separation device 100 further includes, as another nipping members, grip rollers 111 and 112 disposed at a predetermined interval around the circumference or periphery (outer circumferential surface) of the winding roller 109, which is orthogonal to the rotation axis of the winding roller 109. The sheet separation device 100 further includes bifurcating claws T1 and T2 to switch the conveyance direction of the lamination sheet S.

The plurality of grip rollers 111 and 112 is in contact with the winding roller 109 and rotates with the winding roller 109. The grip rollers 111 and 112, together with the winding roller 109, nip (grip) the lamination sheet S and wind the lamination sheet S around the winding roller 109.

The bifurcating claw T1 is disposed between the entrance roller pair 108 and the winding roller 109. The bifurcating claw T2 is disposed between the winding roller 109 and the exit roller pair 113. The positions (orientations) of the bifurcating claws T1 and T2 can be changed by a driver (a motor or the like), and the conveyance direction of the lamination sheet S can be changed.

The grip rollers 111 and 112 and the bifurcating claws T1 and T2 are examples of winding members to wind the lamination sheet S around the winding roller 109.

With reference to FIGS. 1 to 14, a description is given of a series of operations of the sheet separation device 100, that is, operations from separation of the lamination sheet S to insertion of the insertion sheet P. In FIGS. 3 to 14, elements identical to those illustrated in FIG. 1 or 2 are given identical reference numerals, and the descriptions thereof are omitted.

As illustrated in FIG. 1, in the sheet separation device 100 according to the present embodiment, the lamination sheets S, in each of which two sheets are bonded partly, are stacked on the sheet tray 102. The lamination sheets S are stacked with the bonded side thereof on the downstream side in the direction of feeding (conveyance direction) of the pickup roller 105. The pickup roller 105 picks up the lamination sheet S from the sheet tray 102, and the conveyance roller pair 107 conveys the lamination sheet S toward the entrance roller pair 108.

Next, as illustrated in FIG. 2, the lamination sheet S is conveyed by the entrance roller pair 108 toward the nip between the winding roller 109 and the driven roller 110. At this time, the bifurcating claws T1 and T2 are positioned above and below the conveyance passage of the lamination sheet S. The bifurcating claw T1 guides the lamination sheet S from the entrance roller pair 108 between the winding roller 109 and the driven roller 110. The bifurcating claw T2 guides the lamination sheet S from between the winding roller 109 and the driven roller 110 to the exit roller pair 113.

In the present embodiment, ends of the two sheets of the lamination sheet S are bonded together on one of the four sides, and the sheet separation device 100 conveys the lamination sheet S with the bonded side on the downstream side in the forward conveyance direction (direction A). However, the manner of conveyance is not limited thereto but can be as follows. The lamination sheets S are stacked on the sheet tray 102 such that the bonded side thereof is on the upstream side in the direction of feeding (conveyance direction) of the pickup roller 105. The lamination sheet S fed from the sheet tray 102 is conveyed to the exit roller pair 113 in the direction opposite to the direction of conveyance of the exit roller pair 113 toward the winding roller 109.

Figure 3:
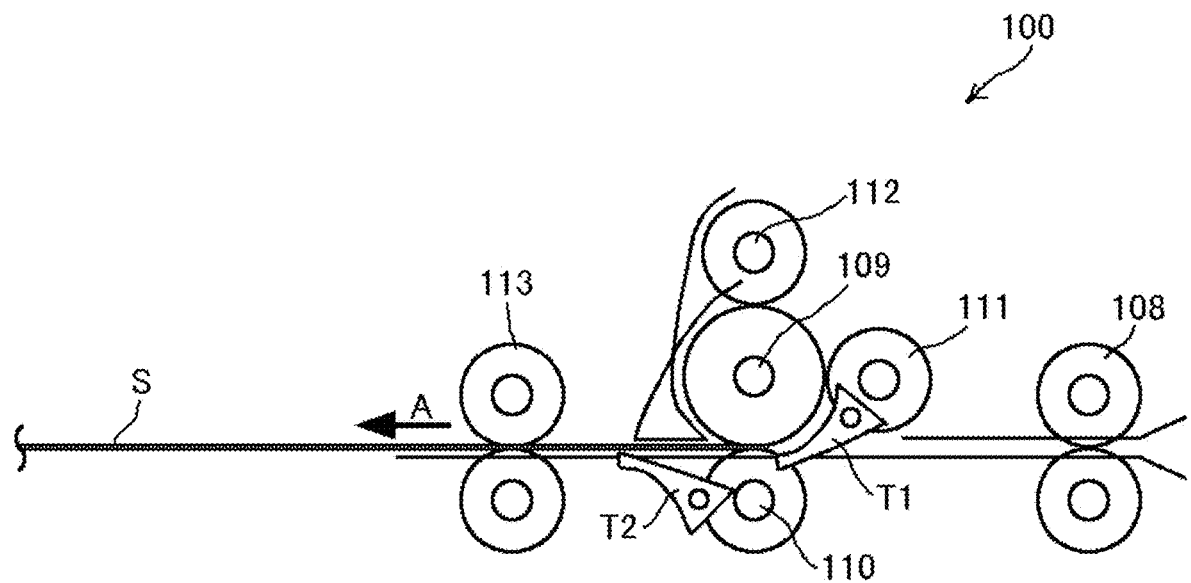
FIG. 3 is a view of the main part of the sheet separation device illustrated in FIG. 1, conveying a lamination sheet in a forward direction.

Subsequently, as illustrated in FIG. 3, the sheet separation device 100 suspends conveyance of the lamination sheet S after the rear end of the lamination sheet S in the forward conveyance direction passes the bifurcating claw T1. For example, when the rear end is nipped between the winding roller 109 and the driven roller 110, the sheet separation device 100 suspends conveyance. At the same time, the bifurcating claw T1 moves (rotates) counterclockwise in the drawing around the rotation axis as a fulcrum, to form a passage (i.e., a winding passage) to guide the rear end of the lamination sheet S around the winding roller 109. These actions can be triggered by the detection of position of the lamination sheet S by the sheet sensor C3 (see FIG. 1).

Figure 4:
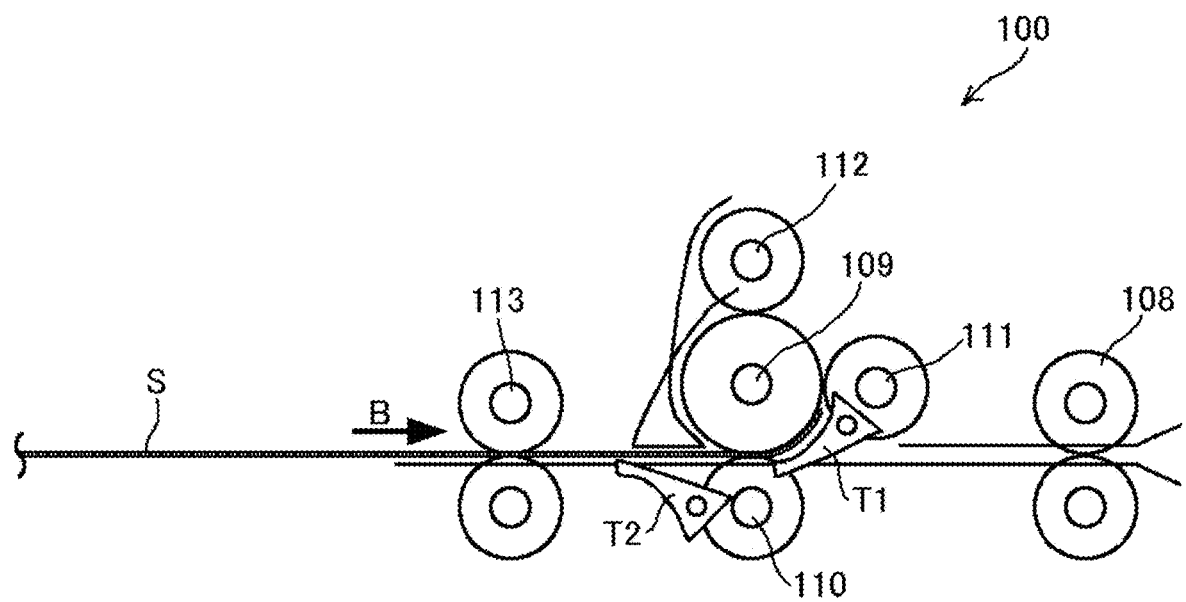
FIG. 4 is a view of the main part of the sheet separation device illustrated in FIG. 1, conveying the lamination sheet in a reverse direction.

Next, as illustrated in FIG. 4, the exit roller pair 113 and the winding roller 109 reverse the rotation direction and convey the lamination sheet S in the reverse conveyance direction (direction B). Then, the lamination sheet S is guided around the winding roller 109 by the bifurcating claw T1. That is, the sheet separation device 100 winds the lamination sheet S around the winding roller 109 from the side where the two overlapping sheets of the lamination sheet S are not bonded. Note that the direction of rotation of the winding roller 109 at this time is referred to as a first rotation direction.

Figure 5:
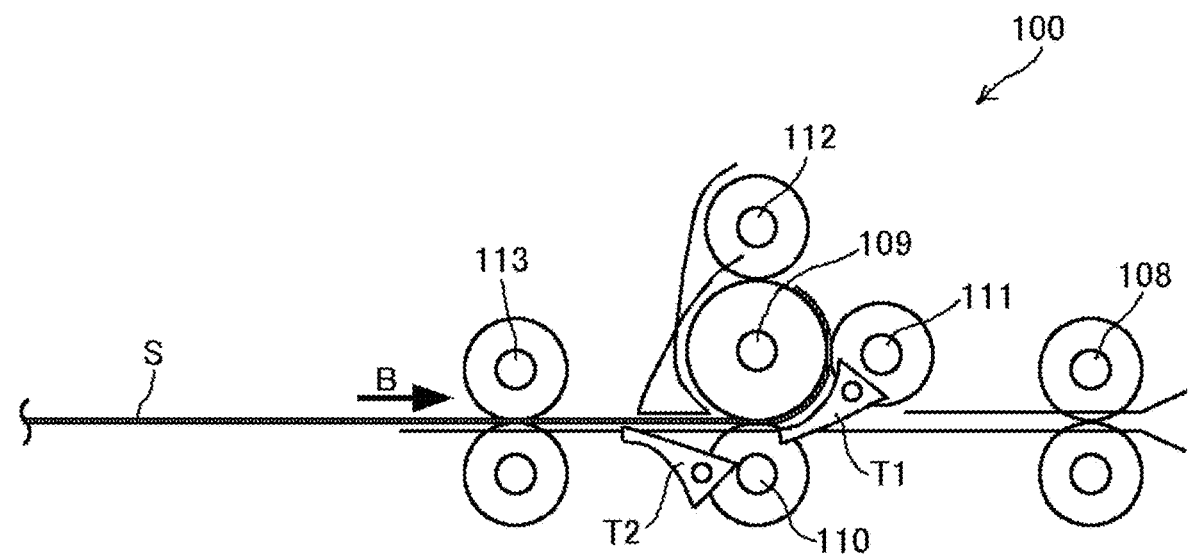
FIG. 5 is a view of the main part of the sheet separation device illustrated in FIG. 1, winding the lamination sheet around a winding roller.
Figure 6:
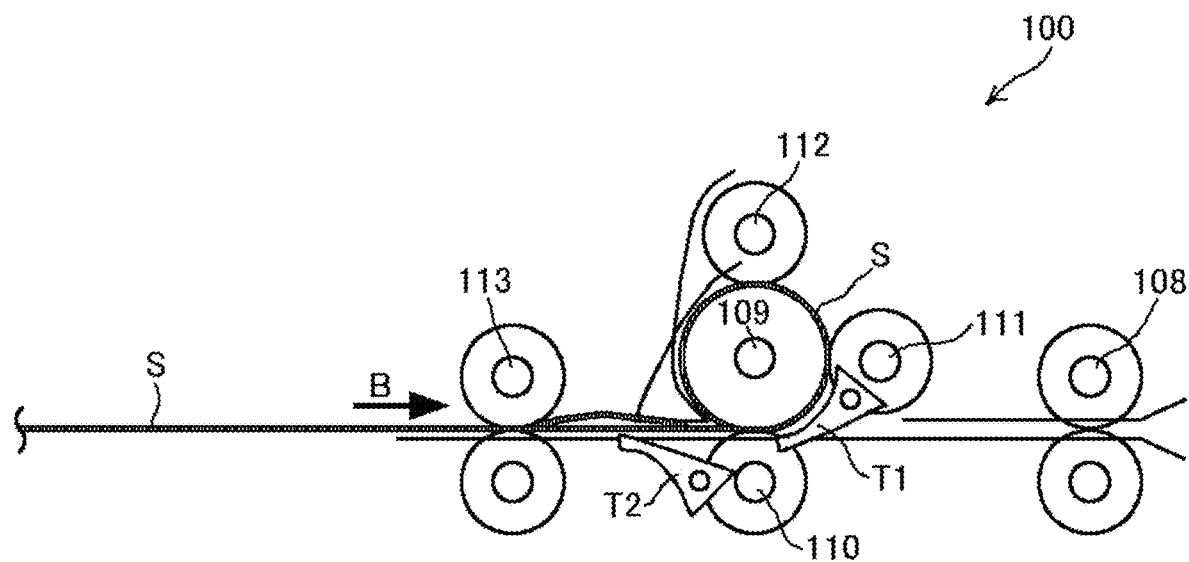
FIG. 6 is another view of the main part of the sheet separation device illustrated in FIG. 1, winding the lamination sheet around the winding roller.
Figure 7:
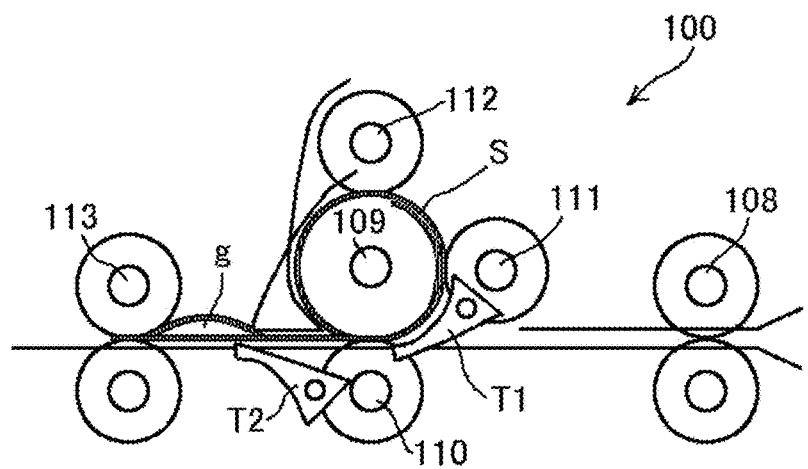
FIG. 7 is another view of the main part of the sheet separation device illustrated in FIG. 1, winding the lamination sheet around the winding roller.

FIGS. 5 to 7 illustrate a process of winding the lamination sheet S around the winding roller 109. The grip rollers 111 and 112 nip the fed lamination sheet S with the winding roller 109 and wind the lamination sheet S around the circumference of the winding roller 109 (see FIG. 5).

When the lamination sheet S is wound around the winding roller 109 over the entire circumference or greater, the end (the unbonded side of the lamination sheet S) of the lamination sheet S is secured to the winding roller 109. As the lamination sheet S is further wound around the winding roller 109, a difference in the circumferential length (a difference in winding amount) is created between the inner peripheral side sheet of the two-ply lamination sheet S and the outer peripheral side sheet thereof. Then, between the exit roller pair 113 and the winding roller 109, the lamination sheet S begins to separate (i.e., a gap starts appearing in the lamination sheet S), as illustrated in FIG. 6.

Then, as illustrated in FIG. 7, the slack in the inner sheet gathers between the exit roller pair 113 and the winding roller 109, and a gap g (space) is created between the inner sheet and the outer sheet.

As described above, the sheet separation device 100 according to the present embodiment winds the lamination sheet S around the winding roller 109, thereby creating a difference in winding circumferential length between the inner sheet and the outer sheet from a geometrical relationship. Thus, the lamination sheet S can be reliably separated.

Subsequently, a description is given of, in the sheet separation device 100 according to the present embodiment, additional configuration and the operation thereof. The additional configuration is for separating the lamination sheet S entirely between the bonded side (first end) and the other side (second end) and inserting the insertion sheet P therein. The second end is an opening end opposed to the bonded side.

Figure 8:
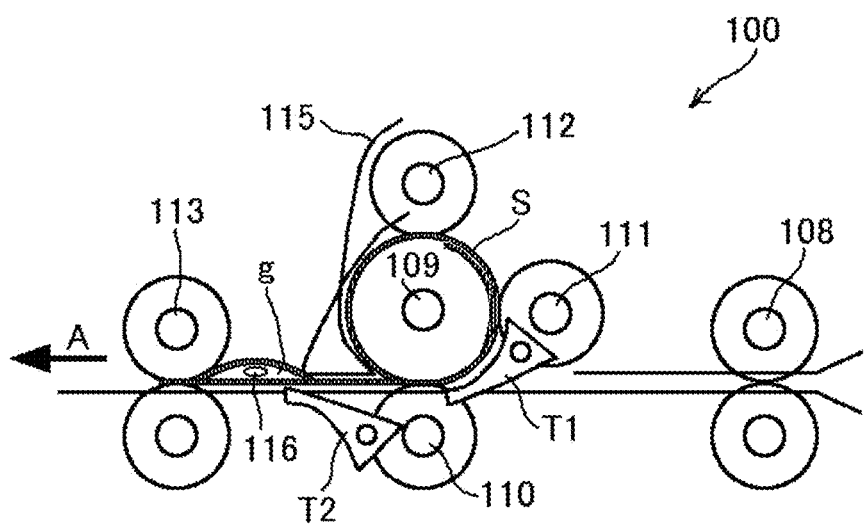
FIG. 8 is a view of the main part of the sheet separation device illustrated in FIG. 1, inserting a separation claw into a gap of the lamination sheet.

As illustrated in FIG. 8, the sheet separation device 100 according to the present embodiment further includes a sheet guide 115 and separation claws 116. The sheet guide 115 is a passage member that defines a conveyance passage and guides one of the separated sheets of the lamination sheet S. The separation claws 116 are disposed on both sides in the width direction of the lamination sheet S and movable in the width direction. The sheet separation device 100 can insert the separation claws 116 into the gap g generated in the lamination sheet S from both sides in the width direction.

Figure 9:
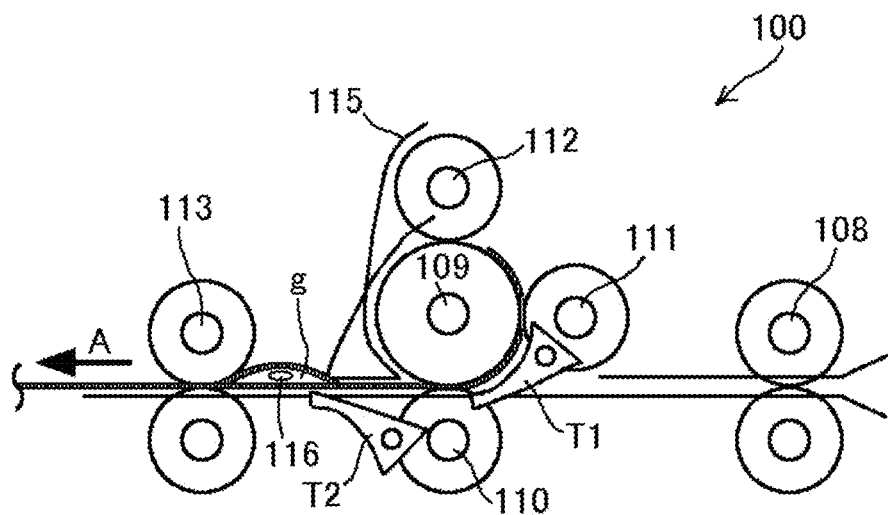
FIG. 9 is a view of the main part of the sheet separation device illustrated in FIG. 1, in which an exit roller pair rotates in the reverse direction with the separation claw inserted in the gap of the lamination sheet.
Figure 10:
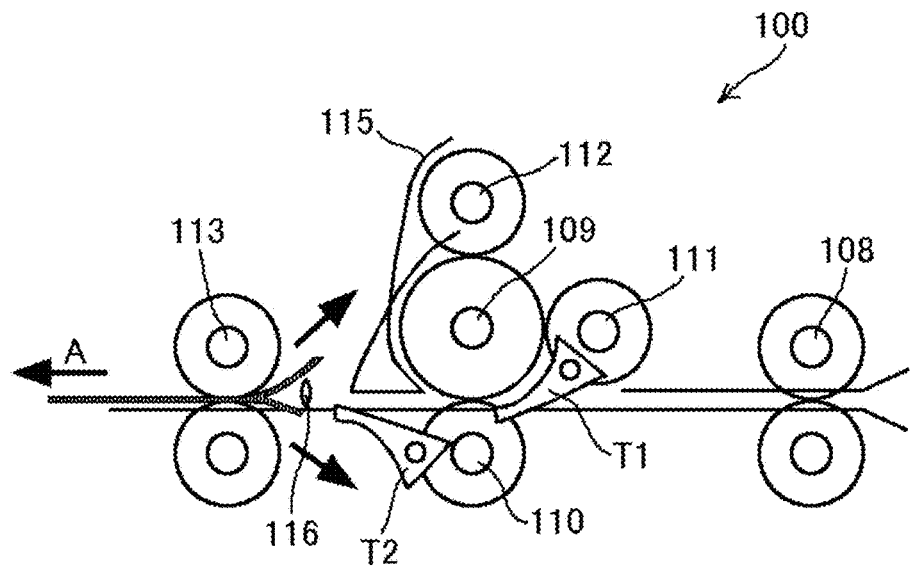
FIG. 10 is a view of the main part of the sheet separation device illustrated in FIG. 1, separating the lamination sheet.

As illustrated in FIG. 9, the sheet separation device 100 rotates the exit roller pair 113 to convey the lamination sheet S in the forward conveyance direction (direction A) with the separation claws 116 inserted in the gap g. Then, as illustrated in FIG. 10, when the separation claws 116 reach the rear end of the lamination sheet S in the conveyance direction, the rear end (opening) of the lamination sheet S can be separated.

The separation claws 116 are described further.

Figure 15:
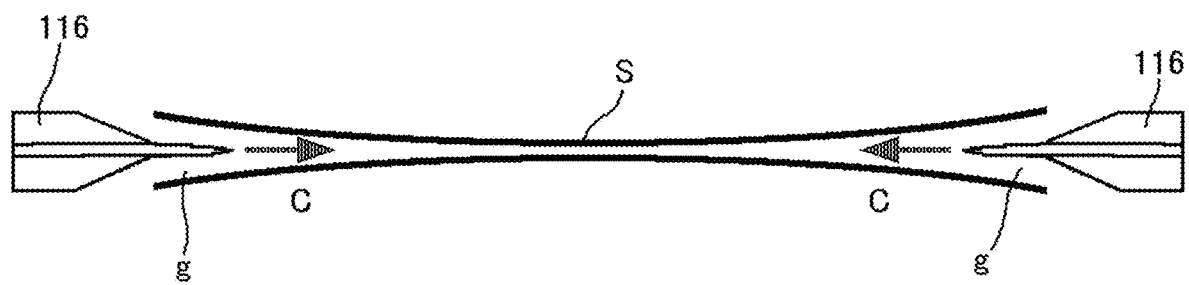
FIG. 15 is a schematic view of the separation claw of the sheet separation device.
Figure 16:
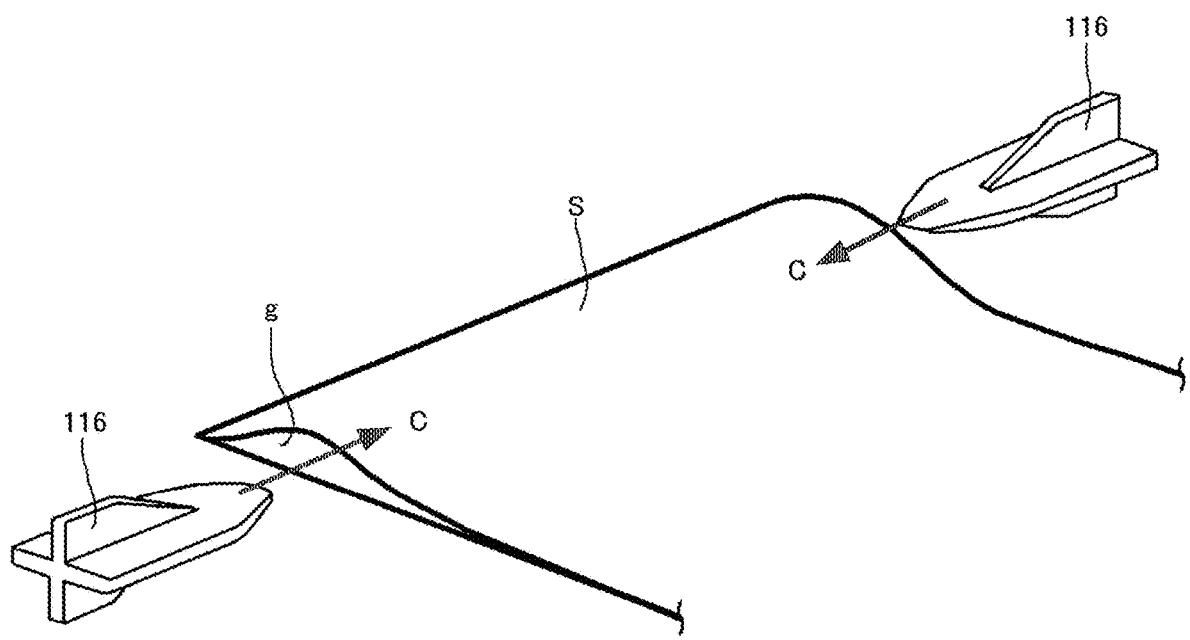
FIG. 16 is a perspective view illustrating how the separation claw separates two sheets of the lamination sheet from each other.
Figure 17:
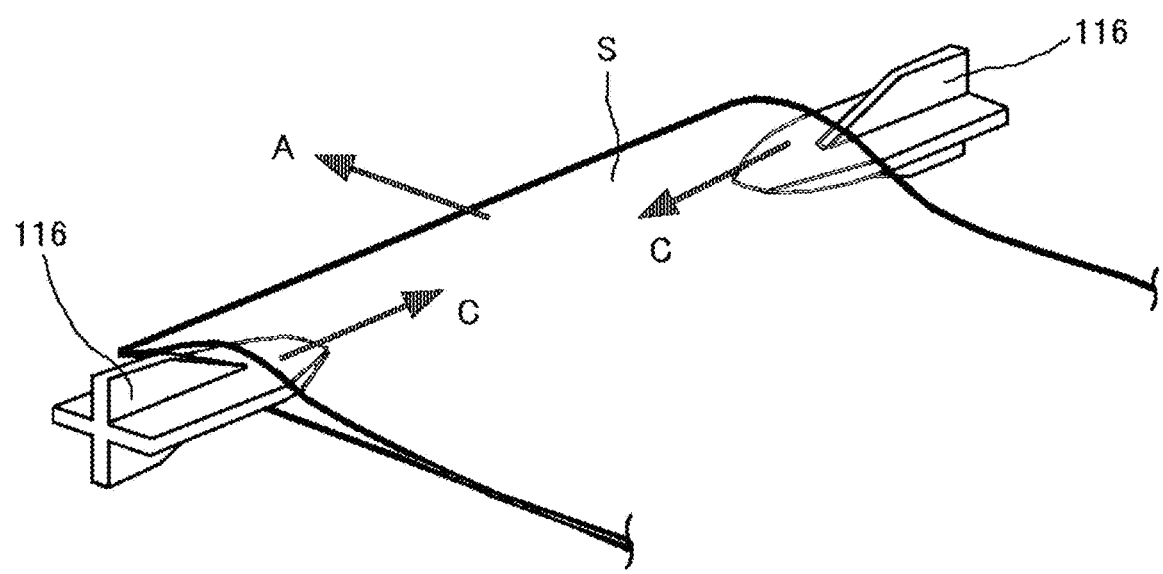
FIG. 17 is another perspective view illustrating how the separation claw separates the two sheets of the lamination sheet from each other.
Figure 18:
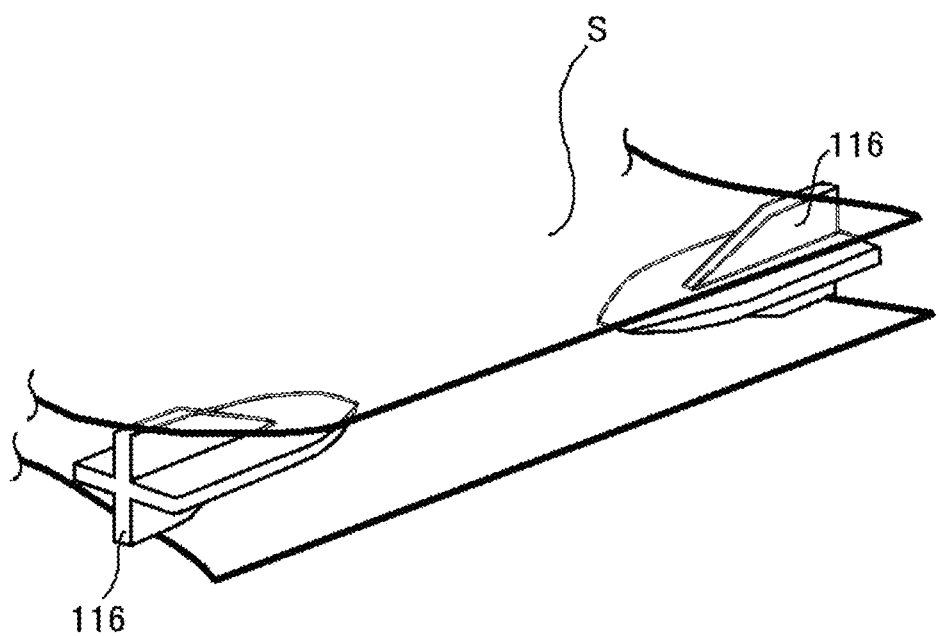
FIG. 18 is another perspective view illustrating how the separation claw separates the two sheets of the lamination sheet from each other.

FIG. 15 is a schematic view of the separation claws in the sheet separation device. FIGS. 16 to 18 are perspective views illustrating how the separation claws separate the two sheets of the lamination sheet S from each other.

As illustrated in these drawings, each separation claw 116 has a shape that gradually rises from the front end to the rear end in the insertion direction (indicated by arrow C). Thus, the separation claws 116 can be smoothly inserted into the gap g generated in the lamination sheet S.

Additionally, as the lamination sheet S is conveyed in the forward conveyance direction (indicated by arrow A) after the separation claws 116 are inserted into the gap g (see FIGS. 16 and 17), the lamination sheet S can be reliably separated to the rear end thereof (see FIG. 18).

Alternatively, the sheet separation device 100 can include only a single separation claw 116, and the separation claw 116 is inserted into only one side of the lamination sheet S. Moreover, the shape of the separation claw 116 is not limited to that illustrated in the drawing. For example, the separation claw 116 can be elliptical or configured to be able to rotate by 90 degrees.

Returning back to FIG. 10, the description is continued below. In the sheet separation device 100, after the exit roller pair 113 conveys the lamination sheet S in the forward conveyance direction (direction A) and separates the lamination sheet S, the bifurcating claw T2 moves (rotates) clockwise around the rotation shaft as a fulcrum and closes the conveyance passage along which the lamination sheet S has been conveyed so far.

Figure 11:
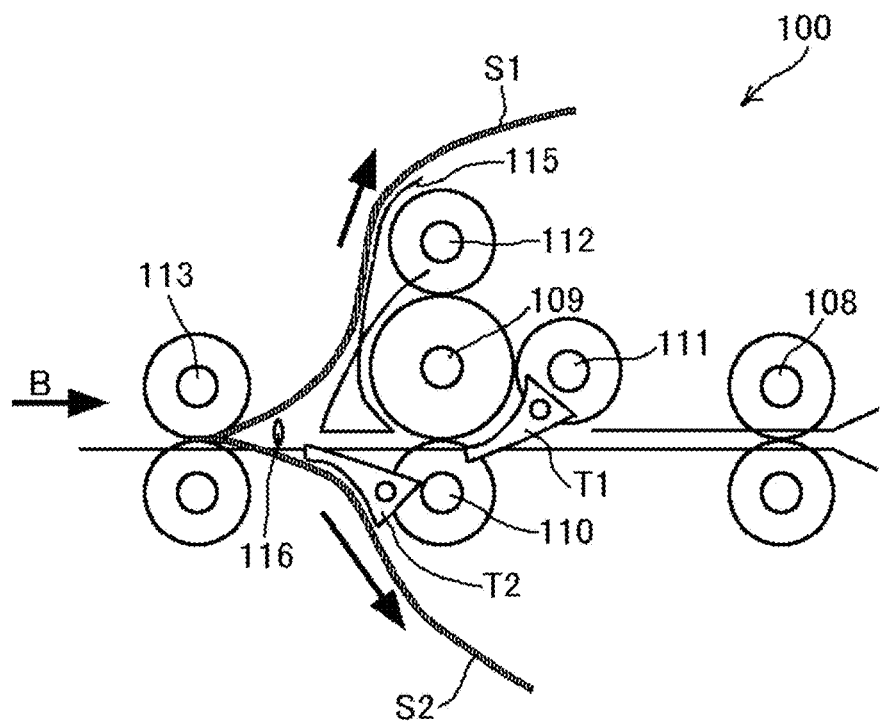
FIG. 11 is a view of the main part of the sheet separation device illustrated in FIG. 1, in which the exit roller pair rotates in the reverse direction with the lamination sheet separated.

Next, as illustrated in FIG. 11, the exit roller pair 113 reverses the rotation, and conveys the lamination sheet S in the reverse conveyance direction (direction B). Then, the two separated sheets of the lamination sheet S (hereinafter referred to as an upper sheet S1 and a lower sheet S2) are guided in different directions. That is, the upper sheet S1 is conveyed along the sheet guide 115, and the lower sheet S2 is conveyed along the bifurcating claw T2 that also serves as a sheet guide. As illustrated in the drawing, the lamination sheet S opens wide to the bonded side as one end.

Figure 12:
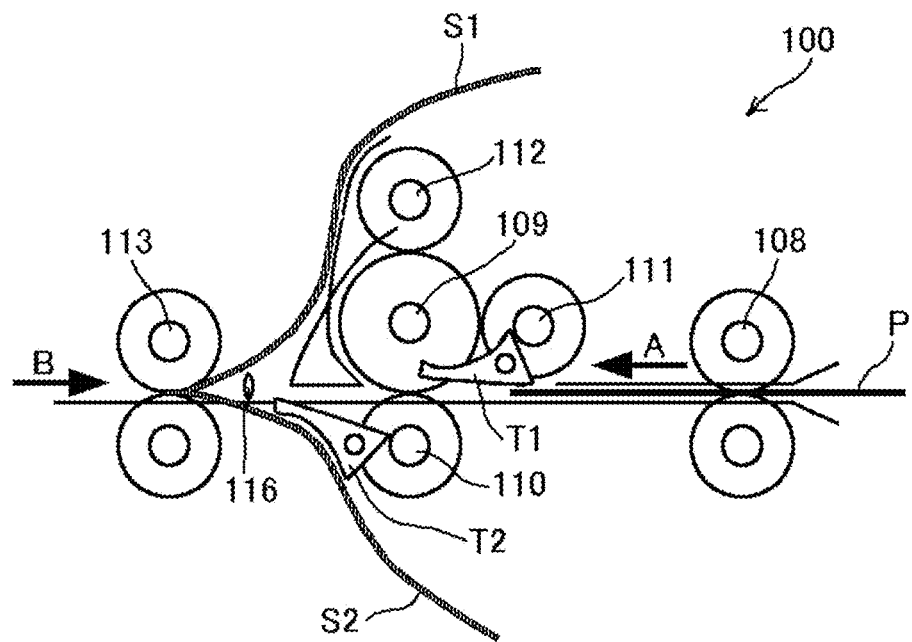
FIG. 12 is a view of the main part of the sheet separation device illustrated in FIG. 1, in which an entrance roller pair conveys an insertion sheet in the forward direction.

Subsequently, as illustrated in FIG. 12, the exit roller pair 113 conveys the lamination sheet S to the designated position in the reverse conveyance direction (direction B) and waits. Meanwhile, the entrance roller pair 108 that is the second feeder conveys the insertion sheet P from the sheet feeding tray 103 (see FIG. 1) toward the exit roller pair 113 in the forward conveyance direction (direction A). At this time, the bifurcating claw T1 is positioned above the conveyance passage, and the insertion sheet P passes below the bifurcating claw T1.

Figure 13:
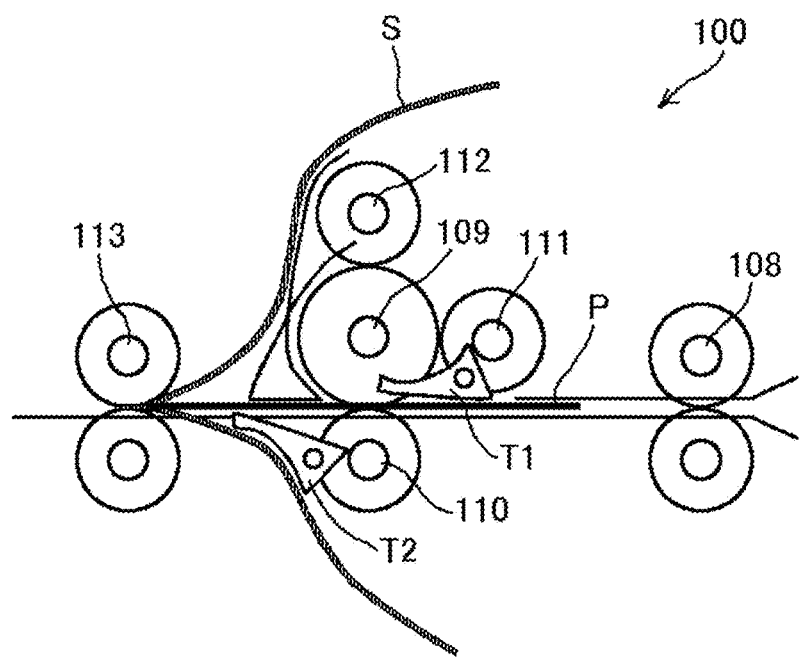
FIG. 13 is a view of the main part of the sheet separation device illustrated in FIG. 1, inserting the insertion sheet between the separated lamination sheet.

Next, as illustrated in FIG. 13, the insertion sheet P is inserted into the opened lamination sheet S. These operations can be triggered by the sheet position detection by the sheet sensor C4 (see FIG. 1).

Figure 14:
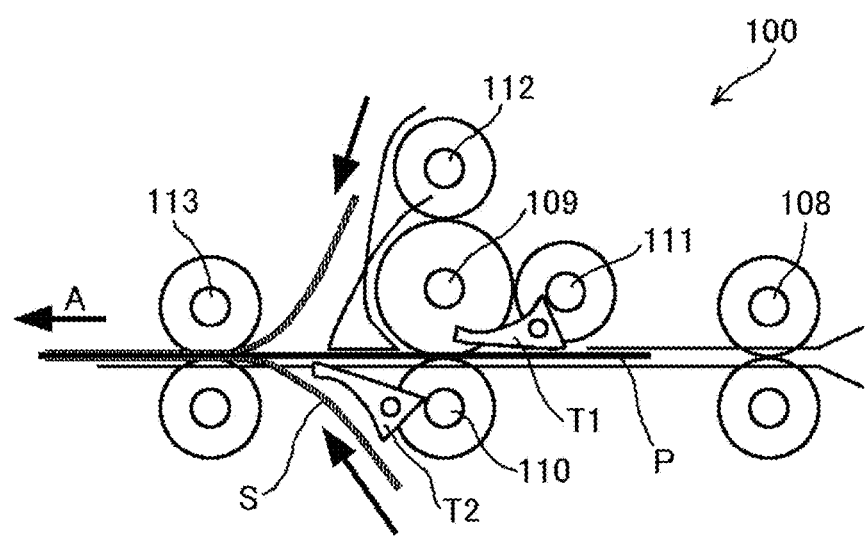
FIG. 14 is a view of the main part of the sheet separation device illustrated in FIG. 1, conveying the lamination sheet in the forward direction with the insertion sheet inserted therein.

As illustrated in FIG. 14, as the exit roller pair 113 conveys the lamination sheet S in which the insertion sheet P is inserted in the forward conveyance direction (direction A), the two sheets are again overlaid one on another, and the opening is closed. Then, the sheet separation device 100 ejects and stacks the lamination sheet S sandwiching the insertion sheet P onto the output tray 104 (FIG. 1) with the exit roller pair 113, or a roller or the like, positioned downstream from the exit roller pair 113.

Figure 19:
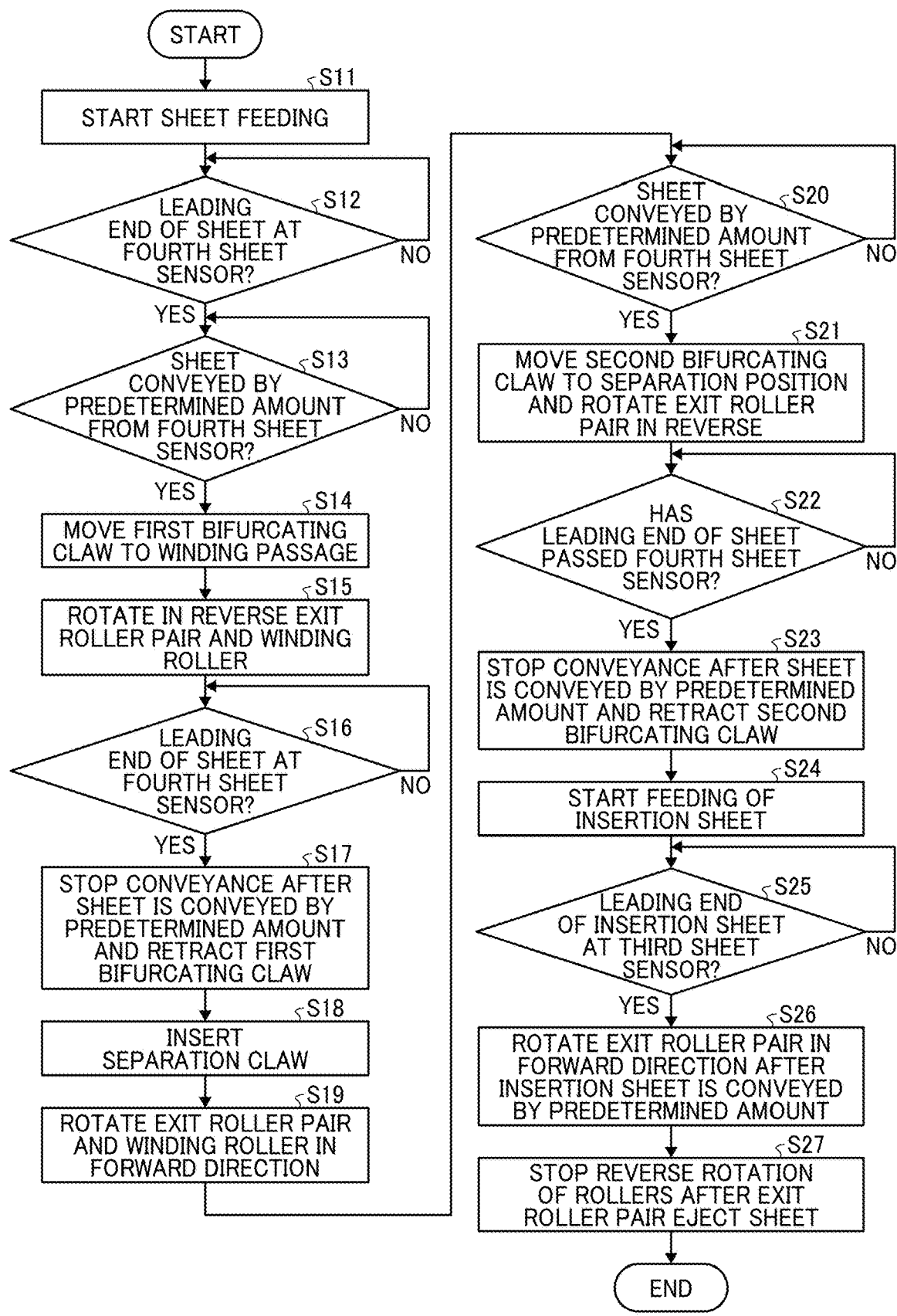
FIG. 19 is a flowchart illustrating a series of operations from sheet feeding to completion of inserting of the insertion sheet.

FIG. 19 is a flowchart illustrating a series of operations from sheet feeding to completion of inserting of the insertion sheet. The description below proceeds while indicating the reference numerals indicated in the flowchart.

In S11, the sheet separation device 100 starts feeding the lamination sheet S (see FIG. 1). In S12, the sheet separation device 100 (the controller 196) determines whether the end of the lamination sheet S has arrived at the sheet sensor C4 as a fourth sensor (see FIG. 2). In S13, in response to a determination that the lamination sheet S has been conveyed by a predetermined amount from the sheet sensor C4 (the fourth sensor), in S14, the sheet separation device 100 moves the bifurcating claw T1 (a first bifurcating claw) to the position to guide the lamination sheet S along the winding passage (see FIG. 3). For example, the predetermined amount is stored in a memory by a manufacturer based on empirical data.

In S15, the sheet separation device 100 rotates the winding roller 109 in the reverse direction and winds the lamination sheet S around the winding roller 109 (see FIGS. 4 to 7). In S16, the sheet separation device 100 determines whether the end of the lamination sheet S has arrived at the sheet sensor C4 (the fourth sensor). In S17, the sheet separation device 100 stops conveyance of the lamination sheet S after the lamination sheet S is conveyed from the sheet sensor C4 by a predetermined amount, and retracts the bifurcating claw T1 (the first bifurcating claw) to a home position. In S18, the separation claws 116 are inserted into the gap g generated as the lamination sheet S is separated (see FIG. 8).

In S19, the sheet separation device 100 rotates the exit roller pair 113 and the winding roller 109 in the forward direction, and conveys the lamination sheet S in the forward conveyance direction. As a result, the sheets of the lamination sheet S are separated from each other to the rear end in the conveyance direction (see FIGS. 9 and 10).

In response to a determination made in S20 that the lamination sheet S has been conveyed by the predetermined amount from the sheet sensor C4, in S21, the sheet separation device 100 moves the bifurcating claw T2 (a second bifurcating claw) to the separation position and rotates the exit roller pair 113 in the reverse direction. In S22, the sheet separation device 100 determines whether or not the end of the lamination sheet S has passed the sheet sensor C4 (see FIG. 11).

In S23, the sheet separation device 100 stops conveyance of the lamination sheet S after the lamination sheet S is conveyed from the sheet sensor C4 by the predetermined amount, and retracts the bifurcating claw T2 (the second bifurcating claw) to the home position. At this time, the lamination sheet S is opened with the bonded side as one end (see FIG. 11).

In S24, the sheet separation device 100 starts feeding the insertion sheet P (see FIG. 12). In S25, the sheet separation device 100 determines that the end of the insertion sheet P has passed the sheet sensor C3 (a third sheet sensor). Then, in S26, the sheet separation device 100 conveys the insertion sheet P by a predetermined amount, to insert the insertion sheet P into the lamination sheet S (see FIG. 13). Then, the exit roller pair 113 is rotated in the forward direction to convey the lamination sheet S, with the insertion sheet P inserted therein, in the forward conveyance direction. Thus, the inserting completes (see FIG. 14). In S27, after the inserting completes and the lamination sheet S is ejected by the exit roller pair 113, the sheet separation device 100 stops the rotation of all rollers.

As described above, the sheet separation device 100 according to the present embodiment can open the lamination sheet S wide and insert and sandwich the insertion sheet P therein. Therefore, for example, compared with a laminator using a vacuum device, the structure is simple, and the entire apparatus can be simple and compact.

In addition, as illustrated in FIG. 1, the sheet separation device 100 according to the present embodiment can store the lamination sheets S and insertion sheet P on separate trays to be conveyed separately. Accordingly, it is not necessary to stack the lamination sheets S and the insertion sheets P in a predetermined order, for added convenience. In the present embodiment, the lamination sheets S are stacked on the sheet tray 102, and the insertion sheets P are stacked on the sheet feeding tray 103. However, where to stack the lamination sheets S and the insertion sheets P are not limited thereto. Alternatively, the insertion sheet P can be stacked on the sheet tray 102 and the lamination sheet S can be stacked on the sheet feeding tray 103.

Next, an aim achieved by an embodiment of this disclosure is described in further detail below.

The inventors have studied to further improve the productivity of the sheet separation device 100 that winds a lamination sheet S around the winding roller 109 and creates the gap g in the lamination sheet S.

Figure 20A:
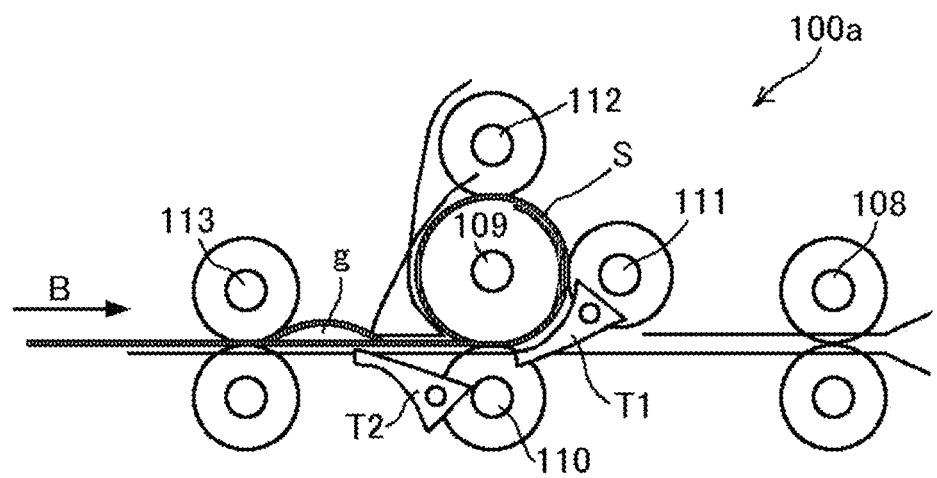
FIGS. 20A and 20B are views illustrating a sheet separation device in which the gap of the lamination sheet is generated before a rear end of the lamination sheet in the reverse direction is nipped by the exit roller pair.
Figure 20B:
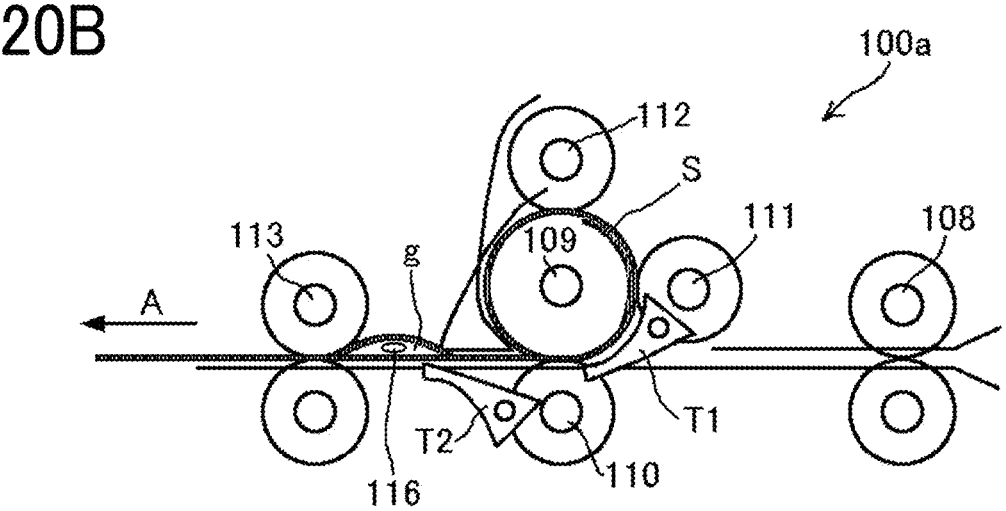

A description is given of improvement of productivity, referring to FIGS. 20A and 20B, which are views of a sheet separation device 100a according to one embodiment of the present disclosure. As illustrated in FIG. 20A, the gap g (space) into which the separation claw 116 is inserted may be generated before the rear end of the lamination sheet S in the reverse conveyance direction (direction B) is nipped by the exit roller pair 113. In that case, no longer the lamination sheet S needs to be wound. If the winding of the lamination sheet S is continued in that state, the next operation is delayed until the rear end of the lamination sheet S reaches the exit roller pair 113, resulting in down time.

Therefore, the time to the start of separating can be shortened and the productivity can be improved as follows. Stop the winding of the lamination sheet S and start insertion of the separation claw 116 (see FIG. 20B) at the time when the gap g (space) into which the separation claws 116 are inserted is generated.

Hereinafter, a description is given of a configuration for shortening the time to the sheet separation in a sheet separation device that winds a two-ply sheet around a rotator and separates two sheets of the two-ply sheet.

A first embodiment is described below.

The amount by which the lamination sheet S is wound around the winding roller 109 until the space g is generated in the lamination sheet S differs depending on the sheet type (such as size, thickness, and material of the lamination sheet S). The time to the start of separating can be shortened by acquiring the information of the sheet to be separated in advance and changing (adjusting) the winding amount in accordance with the sheet information.

Therefore, the sheet separation device 100a of the present embodiment includes a control panel 190, as illustrated in FIG. 21A and accepts sheet information input from the control panel 190. For example, the controller 196 retrieves, from the memory, the winding amount correlated with the sheet information. Further, as illustrated in FIG. 21B, the sheet separation device 100a according to the present embodiment can be connected to the image forming apparatus 300 with a communication interface 194, and the sheet information can be transmitted from the image forming apparatus 300 including a control panel 192.

With this configuration, the sheet separation device 100a can acquire the sheet information and change the amount of winding the lamination sheet S around the winding roller 109 in accordance with the sheet information.

Figure 22:
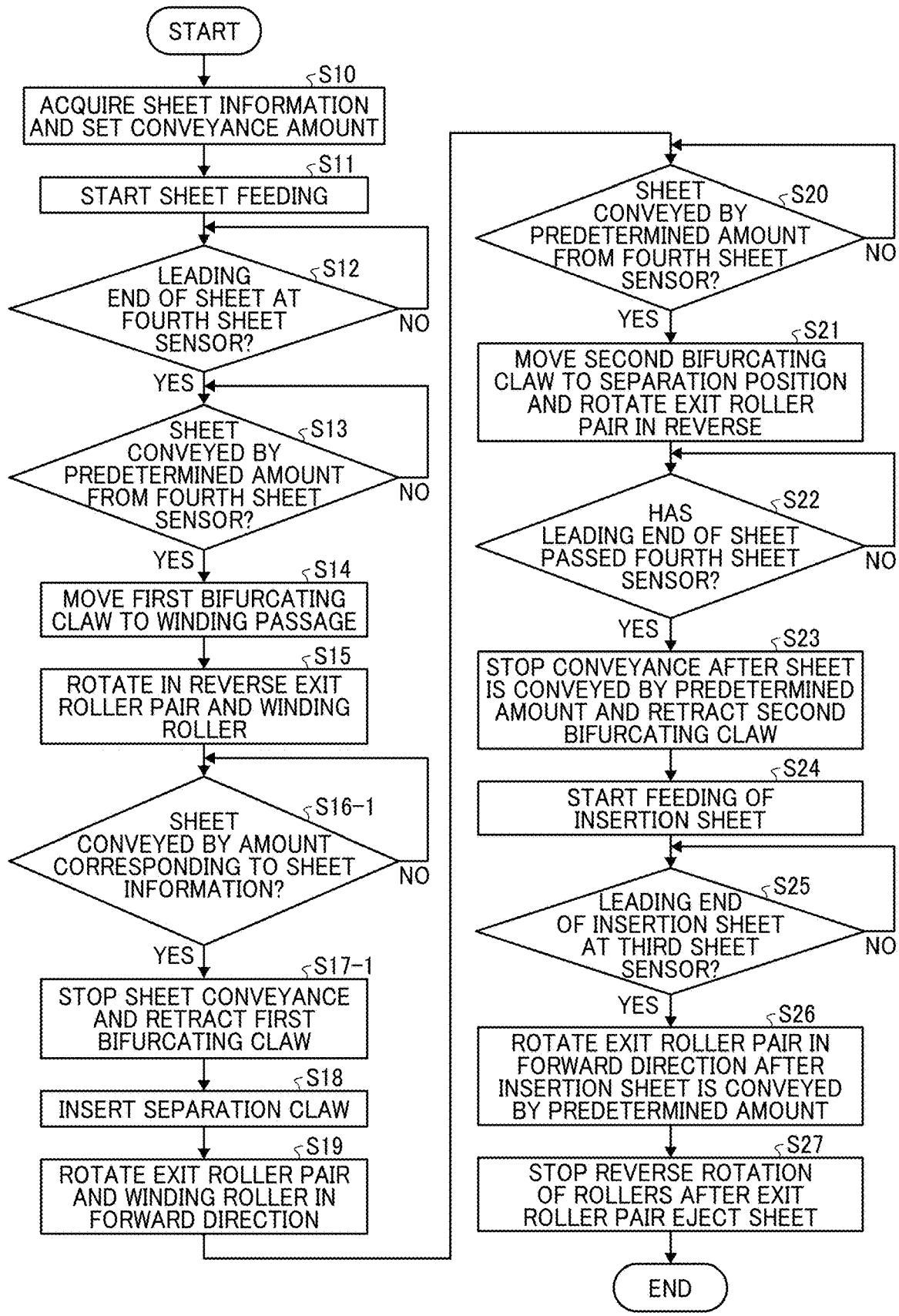
FIG. 22 is a flowchart illustrating a series of operations from changing the winding amount of the lamination sheet in accordance with sheet information (sheet thickness) to separating the lamination sheet.

FIG. 22 is a flowchart illustrating a series of operations from changing the winding amount of the lamination sheet in accordance with the sheet information (e.g., sheet thickness) to separating the sheet. The description below proceeds while indicating the reference numerals indicated in the flowchart.

First, in step S10, the sheet separation device 100a acquires a sheet thickness as sheet information from the control panel 190 (or an image forming apparatus or the like) and sets the winding amount (sheet conveyance amount) corresponding to the thickness of the lamination sheet S.

In S11, the sheet separation device 100a starts feeding the lamination sheet S (see FIG. 1). In S12, the controller 196 determines whether the end of the lamination sheet S has arrived at the sheet sensor C4 as a fourth sensor (see FIG. 2). In S13, in response to a determination that the lamination sheet S has been conveyed by a predetermined amount from the sheet sensor C4 (the fourth sensor), in S14, the sheet separation device 100a moves the bifurcating claw T1 (the first bifurcating claw) to the position to guide the lamination sheet S along the winding passage (see FIG. 3).

In S15, the sheet separation device 100a rotates the winding roller 109 in the reverse direction and winds the lamination sheet S around the winding roller 109 (see FIGS. 4 to 7). In step S16-1, the sheet separation device 100a determines whether the lamination sheet S has been conveyed by the amount corresponding to the thickness of the lamination sheet S. In response to a determination that the lamination sheet S has been conveyed by the thickness-corresponding amount (Yes in S16-1), in S17-1, the sheet separation device 100a stops conveying the lamination sheet S and retracts the bifurcating claw T1 to the home position (see FIG. 20A). In S18, the separation claws 116 are inserted into the gap g generated as the lamination sheet S is separated (see FIG. 20A).

Step S19 and subsequent steps are the same as those in the flowchart of FIG. 19.

As described above, the sheet separation device 100a according to the present embodiment changes (adjusts) the winding amount of the lamination sheet in accordance with the sheet information (sheet thickness). When the lamination sheet S is conveyed by the amount corresponding to the sheet thickness, the sheet separation device 100a starts insertion of the separation claw 116 and conveyance of the lamination sheet S in the forward direction. Therefore, the time to separation of the lamination sheet S is reduced, and the productivity can be improved.

Further, the sheet information is not limited to the thickness of the lamination sheet S. The information of the lamination sheet S can include at least one of the size, thickness, and material of the lamination sheet S.

A second embodiment is described below.

Figure 23:
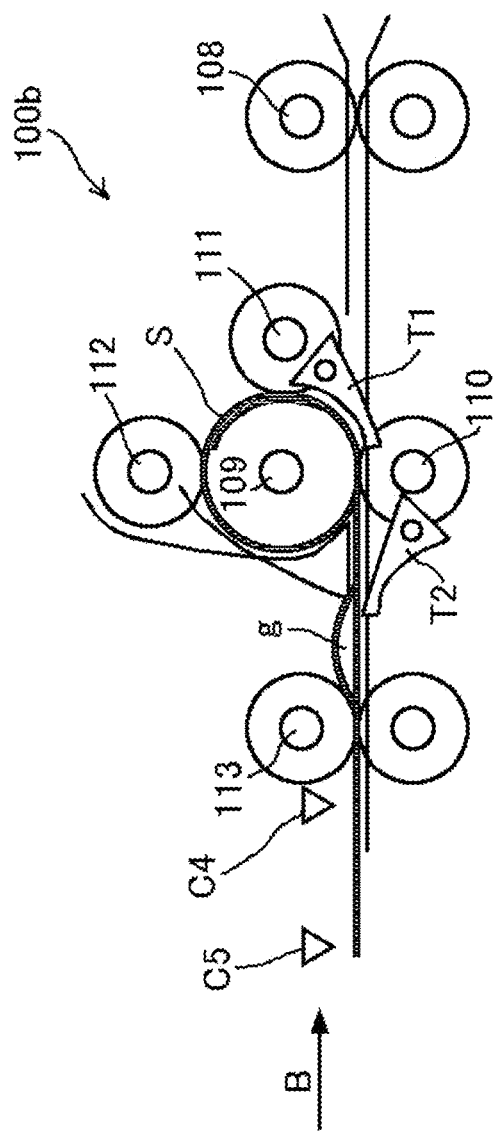
FIG. 23 is a view of a main part of a sheet separation device according to a second embodiment.

FIG. 23 is a view of a main part of a sheet separation device according to the second embodiment. In FIG. 23, elements identical to those illustrated in FIG. 2 are given identical reference numerals, and the descriptions thereof are omitted.

A sheet separation device 100b according to the present embodiment includes a sheet end sensor C5 (a fifth sheet sensor) that detects an end of the lamination sheet S. The sheet end sensor C5 is disposed upstream from the exit roller pair 113 and the sheet sensor C4 in the reverse conveyance direction (direction B).

The sheet separation device 100b stops winding of the lamination sheet S when the lamination sheet S is conveyed downstream from the sheet end sensor C5 in the reverse conveyance direction (direction B), that is, in response to a detection of the end of the lamination sheet S by the sheet end sensor C5 (turning off). Alternatively, the sheet separation device 100b can stop the winding after the lamination sheet S is conveyed by a predetermined amount from when the conveyance sensor C5 is turned off.

Figure 24:
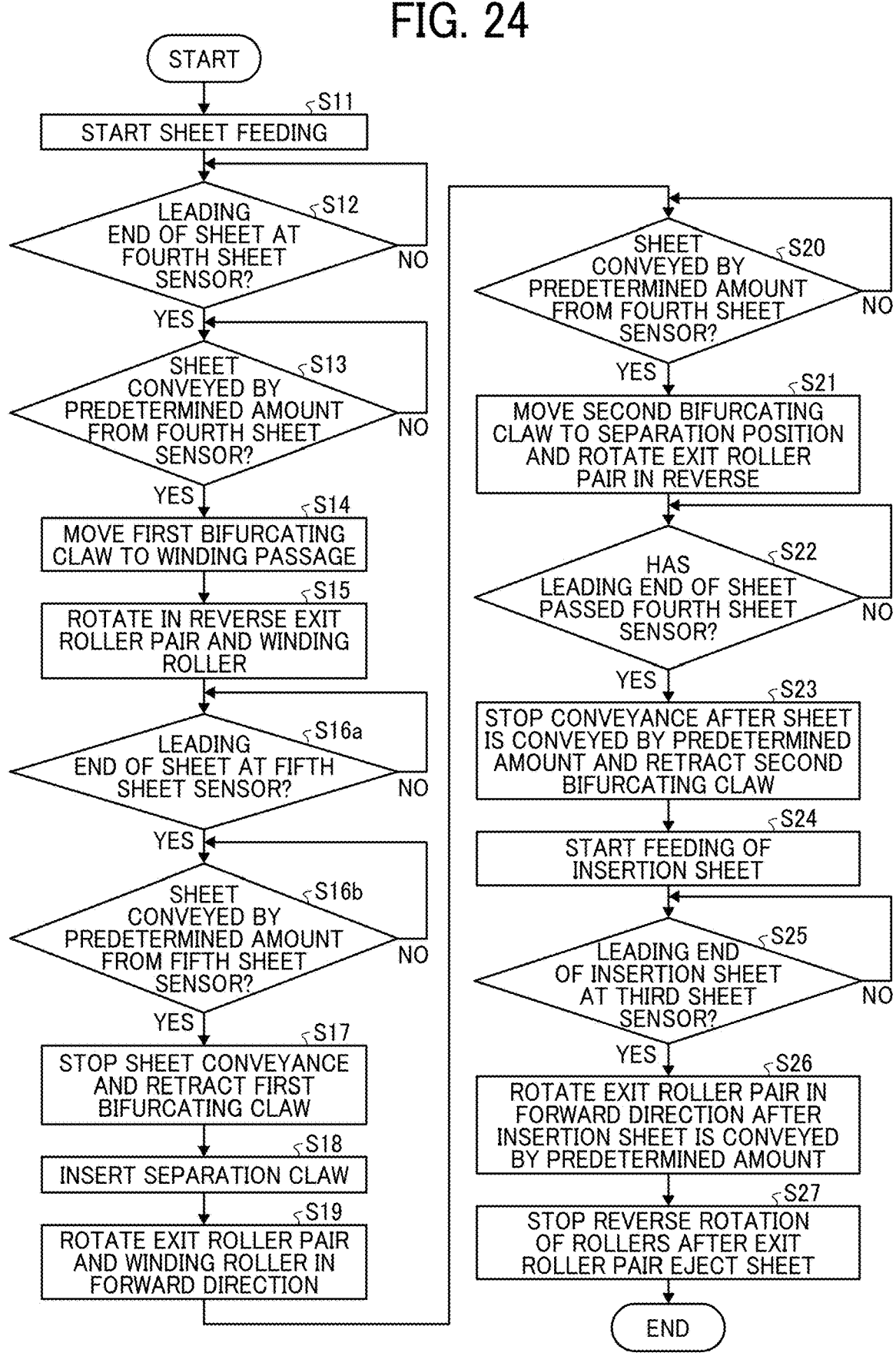
FIG. 24 is a flowchart illustrating a series of operations from changing the winding amount of the lamination sheet in accordance with a detection result of a conveyance sensor to separating the sheet.

FIG. 24 is a flowchart illustrating a series of operations from changing the sheet winding amount in accordance with the detection result of the sheet sensor (a conveyance sensor) to separating the sheet. The description below proceeds while indicating the reference numerals indicated in the flowchart.

In S11, the sheet separation device 100b starts feeding the lamination sheet S (see FIG. 1). In S12, the sheet separation device 100 determines whether the end of the lamination sheet S has arrived at the sheet sensor C4 as a fourth sensor (see FIG. 2). In S13, in response to a determination that the lamination sheet S has been conveyed by a predetermined amount from the sheet sensor C4 (the fourth sensor), in S14, the sheet separation device 100b moves the bifurcating claw T1 (a first bifurcating claw) to the position to guide the lamination sheet S along the winding passage (see FIG. 3).

In S15, the sheet separation device 100b rotates the winding roller 109 in the reverse direction and winds the lamination sheet S around the winding roller 109 (see FIGS. 4 to 7). Next, in S16a, the sheet separation device 100b determines whether the leading end of the lamination sheet S has reached the sheet end sensor C5.

In response to a determination that the leading end of the lamination sheet S has reached the sheet end sensor C5, in S16b, the sheet separation device 100b determines whether the lamination sheet S has been conveyed by the predetermined amount from the sheet end sensor C5. When the lamination sheet S has been conveyed by the predetermined amount, in S17, the sheet separation device 100b stops conveying the lamination sheet S and retracts the bifurcating claw T1 to the home position (see FIG. 20A). In S18, the separation claws 116 are inserted into the gap g generated as the lamination sheet S is separated (see FIG. 20A).

Step S19 and subsequent steps are the same as those in the flowchart of FIG. 19.

As described above, in the present embodiment, the sheet end sensor C5 that detects the end of the lamination sheet S is disposed upstream from the sheet sensor C4 in the reverse conveyance direction (direction B), and the winding amount of the lamination sheet S is changed (adjusted) in accordance with the detection result generated by the sheet end sensor C5. Therefore, while the winding amount is adjusted in accordance with the detection result of the sheet end sensor C5, the time to separation of the lamination sheet S can be reduced, and the productivity can be improved.

A third embodiment is described below.

Figure 25:
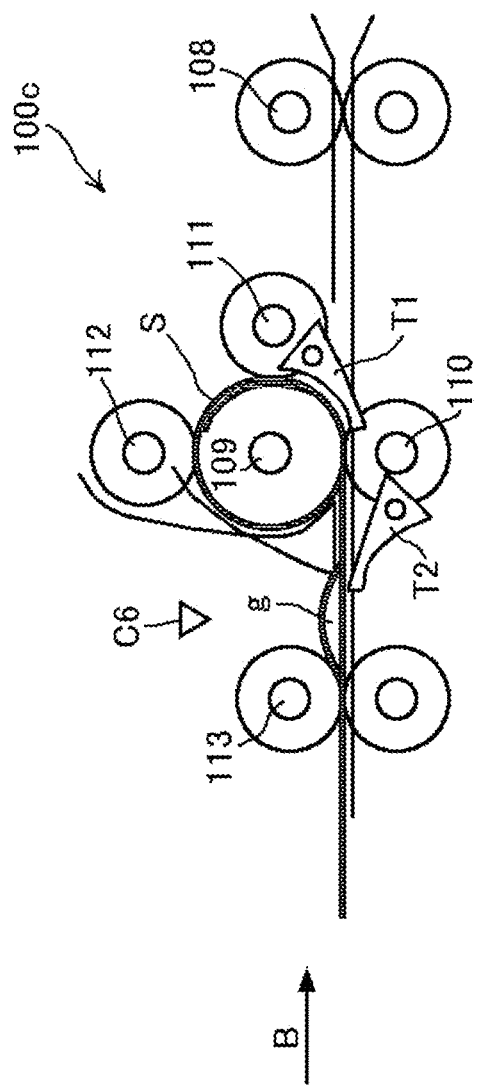
FIG. 25 is a view of a main part of a sheet separation device according to a third embodiment.

FIG. 25 is a view illustrating a main part of a sheet separation device according to the third embodiment. In FIG. 25, elements identical to those illustrated in FIG. 2 are given identical reference numerals, and the descriptions thereof are omitted.

A sheet separation device 100c according to the present embodiment includes a distance sensor C6 that detects the distance to one surface of the lamination sheet S. The distance sensor C6 is disposed between the exit roller pair 113 and the winding roller 109 in the conveyance direction.

The distance sensor C6 detects the amount of bending of the lamination sheet S generated between the exit roller pair 113 and the winding roller 109. The sheet separation device 100c stops winding the lamination sheet S in response to a determination, based on the detection result of the distance sensor C6, that the gap g into which the separation claw 116 is insertable is generated.

Figure 26:
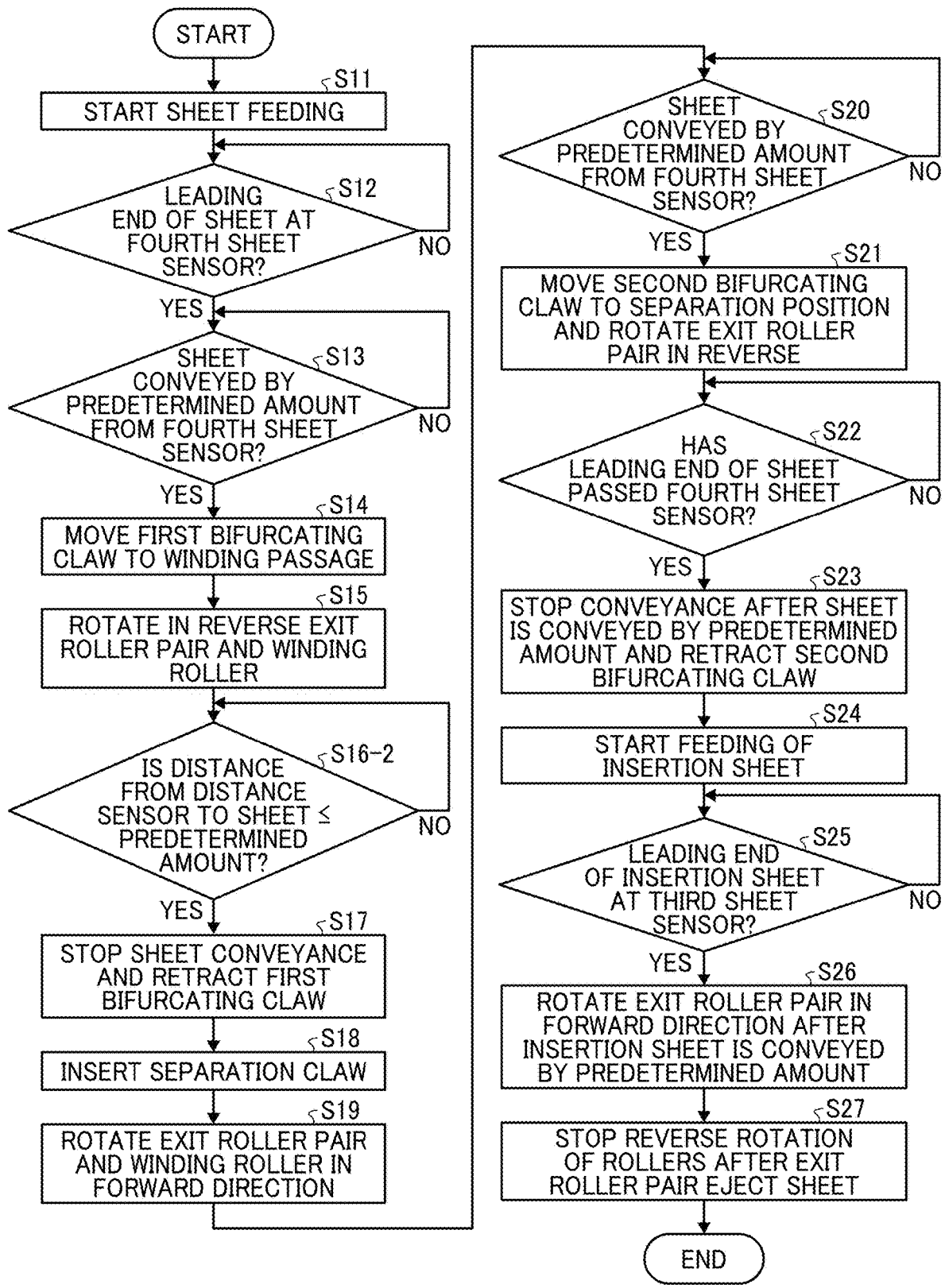
FIG. 26 is a flowchart illustrating a series of operations from changing the sheet winding amount in accordance with a detection result of a distance sensor to separating the sheet.

FIG. 26 is a flowchart illustrating a series of operations from changing the winding amount of the lamination sheet in accordance with a detection result of a distance sensor to separating the sheet. The description below proceeds while indicating the reference numerals indicated in the flowchart.

In S11, the sheet separation device 100c starts feeding the lamination sheet S (see FIG. 1). In S12, the sheet separation device 100 determines whether the end of the lamination sheet S has arrived at the sheet sensor C4 as a fourth sensor (see FIG. 2). In S13, in response to a determination that the lamination sheet S has been conveyed by the predetermined amount from the sheet sensor C4 (the fourth sensor), in S14, the sheet separation device 100c moves the bifurcating claw T1 (the first bifurcating claw) to the position to guide the lamination sheet S along the winding passage (see FIG. 3).

In S15, the sheet separation device 100c rotates the winding roller 109 in the reverse direction and winds the lamination sheet S around the winding roller 109 (see FIGS. 4 to 7). In S16-2, the sheet separation device 100c determines whether the distance between the distance sensor C6 and one surface of the lamination sheet S is equal to or less than a predetermined amount. The predetermined amount can be stored in a memory, for example, by a manufacturer based on empirical data. When the distance is equal to or less than the predetermined amount, in S17, the sheet separation device 100b stops conveying the lamination sheet S and retracts the bifurcating claw T1 to the home position (see FIG. 20A). In S18, the separation claws 116 are inserted into the gap g generated as the lamination sheet S is separated (see FIG. 20A).

Step S19 and subsequent steps are the same as those in the flowchart of FIG. 19.

As described above, in the present embodiment, the winding amount of the lamination sheet S is changed (adjusted) in accordance with the detection result of the distance sensor C6 disposed between the exit roller pair 113 and the winding roller 109. Accordingly, the time to separating can be shortened, and productivity can be improved.

The aspects of the first to third embodiments can be used in combination. For example, after the end of the lamination sheet S is detected by the conveyance sensor C5, further the slack of the lamination sheet S can be detected by the distance sensor C6. With this configuration, the separation claw 116 can be reliably inserted into the gap g formed in the lamination sheet S.

Descriptions are given of variations of the present embodiment.

A first variation is described below.

In the above description with reference to FIG. 6, the end of the lamination sheet S can be secured to the winding roller 109 as the lamination sheet S is wound around over the full circumference or greater of the winding roller 109. By contrast, in the present variation, a description is given of a sheet separation device that can separate sheets of the lamination sheet S by winding the sheets over less than the full circumference of the roller.

Figure 27:
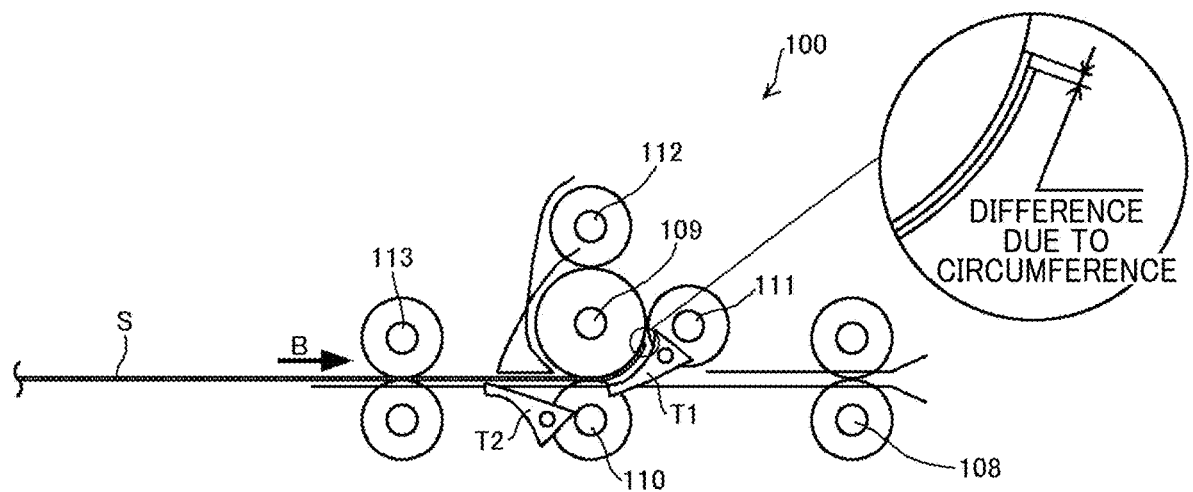
FIG. 27 is a view of a structure illustrated in FIG. 4, together with a partial enlarged view of a lamination sheet on a winding roller illustrated in FIG. 4.
Figure 28:
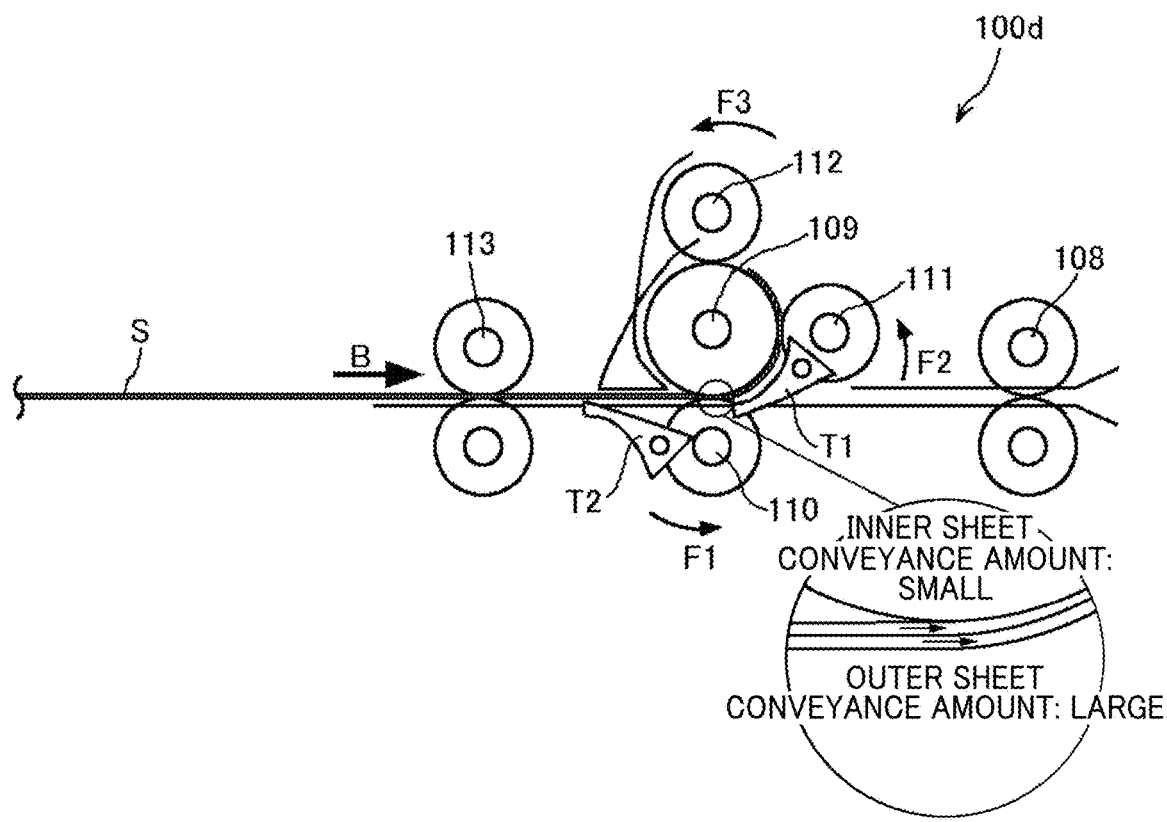
FIG. 28 is a view of a main part of a sheet separation device according to a first variation, together with a partial enlarged view of the lamination sheet on the winding roller.

FIG. 27 is a view of the structure illustrated in FIG. 4, together with a partial enlarged view of the lamination sheet S on the winding roller. FIG. 28 is a view of a main part of a sheet separation device according to the first variation, together with a partial enlarged view of the lamination sheet on the winding roller.

As illustrated in the partial enlarged view of FIG. 27, when the lamination sheet S is wound around the winding roller 109, a difference is created in the conveyance amount of the lamination sheet S due to the difference in winding circumferential length.

By contrast, as illustrated in FIG. 28, in a sheet separation device 100d according to the present variation, a relation F1<F2<F3 is established where F1 represents the nipping force provided by the driven roller 110, F2 represents the nipping force provided by the grip roller 111, and F3 represents the nipping force provided by the grip roller 112. That is, the nipping forces by the grip rollers 111 and 112 are made larger than the nipping force provided by the driven roller 110, and the displacement between the inner sheet and the outer sheet of the lamination sheet S is regulated in the portions where the grip rollers 111 and 112 press against the driven roller 110.

Therefore, the inner sheet and outer sheet slip past each other by an amount equivalent to the circumferential length difference in the nip between the driven roller 110 and the winding roller 109. Thus, the conveyance amount of the inner sheet of the lamination sheet S is smaller than the conveyance amount of the outer sheet. As a result, even if the lamination sheet S is not wound around the winding roller 109 over the full circumference or greater, the slack in the inner sheet gathers between the exit roller pair 113 and the winding roller 109, thereby creating the gap g (space) between the inner sheet and the outer sheet.

Thus, owing to the configuration in which the strengths of nipping force provided by the driven roller 110 and the grip rollers 111 and 112 increase in the winding rotation direction of the winding roller 109, the lamination sheet S can be separated by winding the sheets over less than full circumference of the roller. Accordingly, the winding amount of the lamination sheet S can be reduced, and time required for separation can be shortened.

Further, it is desirable that the nipping force provided by the driven roller 110 and the grip rollers 111 and 112 can be changed by, for example, adjusting the respective contact forces against the winding roller 109. The sheet separation device 100d is advantageous in that sheets of various sizes can be separated by adjusting the amount of winding of the lamination sheet.

Figure 29:
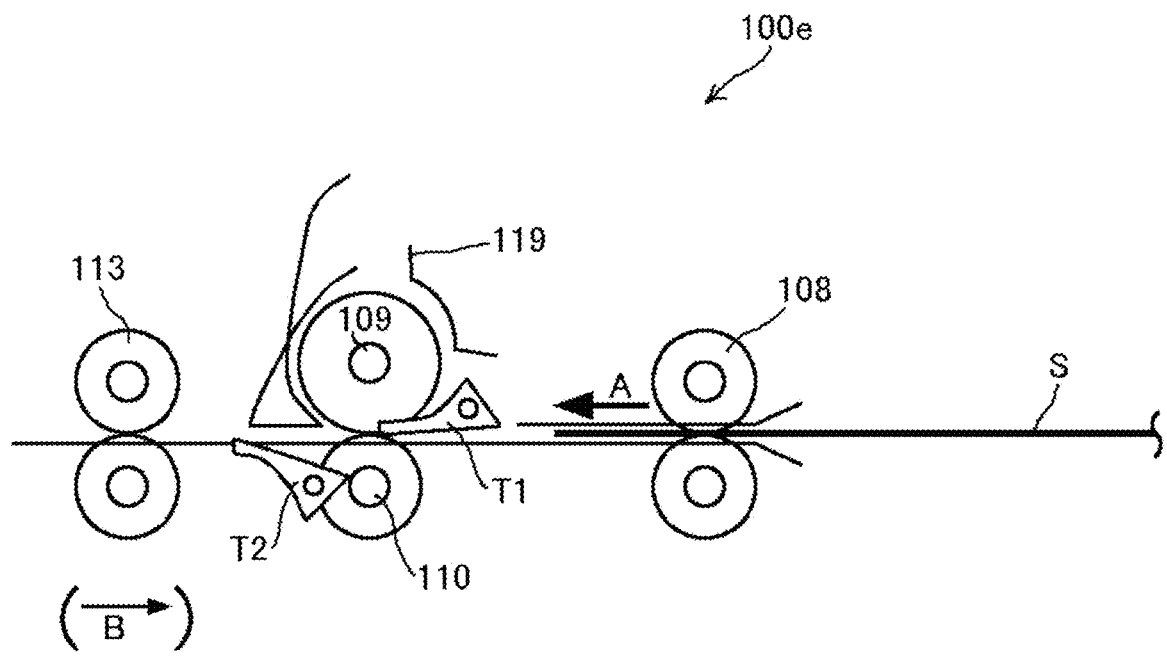
FIG. 29 is a view of a main part of a sheet separation device according to a second variation.

A second variation is described below. FIG. 29 is a view illustrating a main part of a sheet separation device according to a second variation. As illustrated in FIG. 29, a sheet separation device 100e according to the present variation includes, instead of the grip rollers 111 and 112, a guide member 119 that guides the two-ply lamination sheet S around the circumference of the winding roller 109.

By winding the lamination sheet S around the winding roller 109 with the guide member 119, the lamination sheet S can be separated. Note that both the guide member 119 and the grip rollers 111 and 112 can be provided.

A third variation is described. It is described that the sheet separation device 100 and the variations thereof can convey the lamination sheet with the jointed side (one side) positioned upstream or downstream in the conveyance direction. In the embodiments described above, the lamination sheet S is conveyed with the jointed side positioned downstream (on the leading end) in the forward conveyance direction (direction A).

Alternatively, the lamination sheet S can be conveyed with the unbonded side being the downstream end (leading end) in the forward conveyance direction (direction A). That is, the bonded side can be at the upstream end (rear end) in the forward conveyance direction (direction A). In this case, when the lamination sheet S is wound around the winding roller 109, the rear end in the winding direction, that is, the unbonded ends (one side) of the lamination sheet S separate from each other and deviate from each other by the difference in circumferential length. The lamination sheet S can be separated by pinching such deviated portion with, for example, an electric gripper.

A fourth variation is described below.

Figure 30:
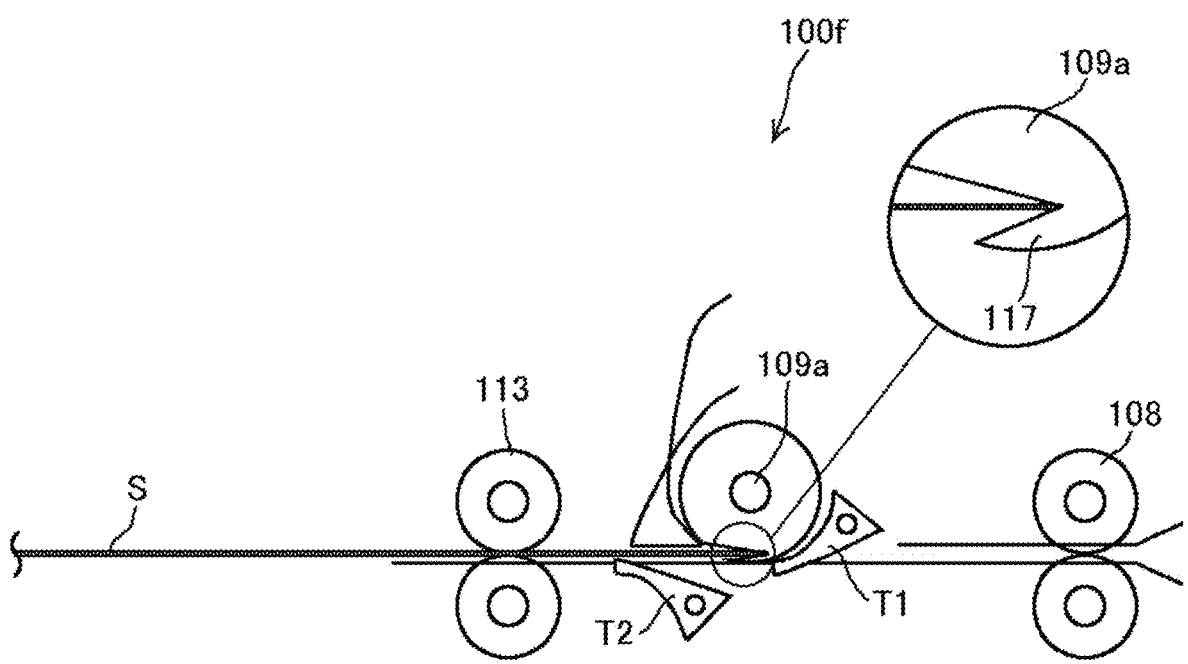
FIG. 30 is a view of a main part of a sheet separation device according to a fourth variation, together with a partial enlarged view of the lamination sheet on the winding roller.

FIG. 30 is a view of a main part of a sheet separation device according to the fourth variation, together with a partial enlarged view of the lamination sheet on the winding roller. In FIG. 30, elements identical to those illustrated in FIG. 2 are given identical reference numerals, and the descriptions thereof are omitted.

A sheet separation device 100f according to the present embodiment does not include the driven roller 110 and the grip rollers 111 and 112. Instead, the sheet separation device 100c includes a winding roller 109a including a wedge portion 117 as illustrated in the partial enlarged view. The wedge portion 117 is an example of a holder that holds the two-ply lamination sheet S and is integral with the winding roller 109a on the outer periphery thereof.

In the sheet separation device 100f according to the present variation, the exit roller pair 113 conveys the lamination sheet S to the winding roller 109a and inserts the end of the lamination sheet S into the wedge portion 117, thereby holding the end of the lamination sheet S.

Figure 31A:
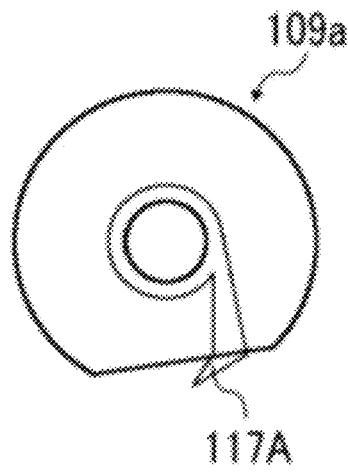
FIG. 31A is a schematic view of a wedge part as a separate component from a winding roller according to the second embodiment.
Figure 31B:
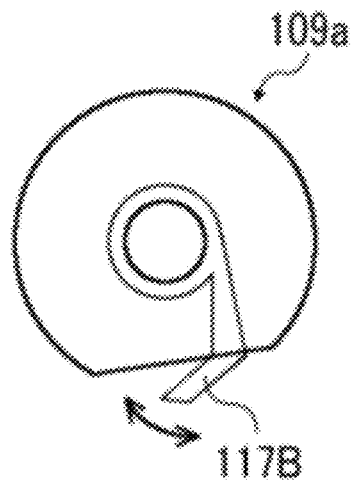
FIG. 31B is a schematic view of a wedge part being an elastic member, according to the second embodiment.

The required function of the wedge portion 117 is securing the lamination sheet S (the end thereof) to the winding roller 109a, and the winding roller 109a can includes a separate wedge portion 117A as illustrated in FIG. 31A. Further, as illustrated in FIG. 31B, the lamination sheet S can be nipped (held) by an elastic member 117B, such as a clip, having an elastic force. Such a structure can be selected depending on the configuration of the sheet separation device.

Figure 32:
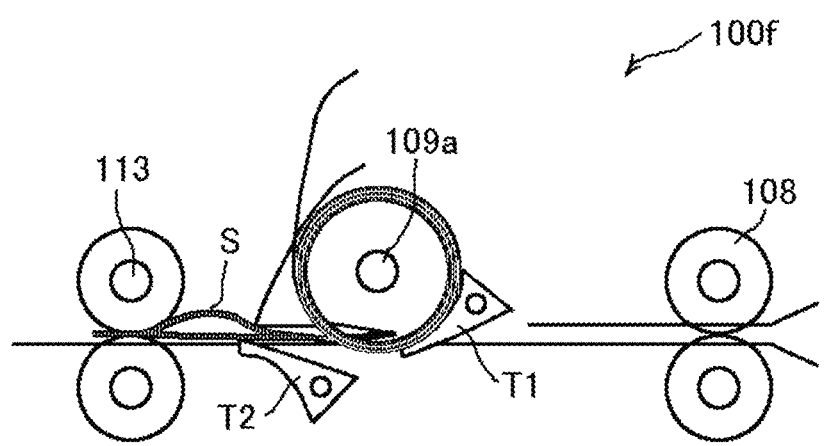
FIG. 32 is another view of the main part of the sheet separation device according to the second embodiment.

In the sheet separation device 100f according to the present embodiment, the operation to conveying the lamination sheet S to the winding roller 109a and the operation after holding the lamination sheet S on the winding roller 109a are the same as those in the first embodiment described above. As illustrated in FIG. 32, by winding the lamination sheet S around the winding roller 109a, a difference in winding circumferential length is caused between the inner and outer sheets of the lamination sheet S, and the lamination sheet S can be separated.

Since the sheet separation device 100f according to the present variation does not use the driven roller 110 and the grip rollers 111 and 112, adjustment of the conveyance force thereof is not necessary. In addition, compared with the first to third embodiments, the configuration is simpler, and the entire apparatus can be further simplified and downsized.

Next, descriptions are given of a laminator, an image forming apparatus, and an image forming system including a sheet separation device according to the present disclosure.

Figure 33:
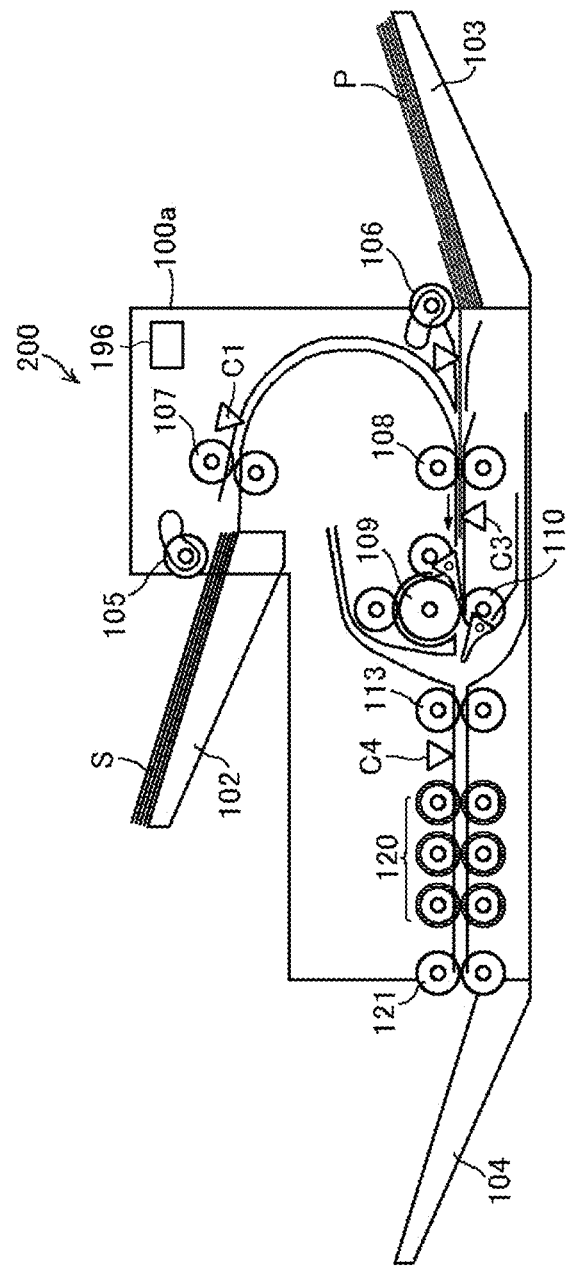
FIG. 33 is a view illustrating an example of general arrangement of a laminator including a sheet separation device according to one embodiment.

FIG. 33 is a view illustrating an example of general arrangement of the laminator including the sheet separation device according to one embodiment of the present disclosure. As illustrated in FIG. 33, a laminator 200 includes the sheet separation device 100a described above, heat and pressure rollers 120 (heat and pressure member) to heat and press the lamination sheet S, and an ejection roller 121 disposed downstream from the heat and pressure rollers 120.

The laminator 200 can perform a series of operations from feeding and separation of the lamination sheet S, insertion of the insertion sheet P, and lamination with heat and pressure on a stand-alone basis. This series of operations can be carried out automatically without human intervention, and convenience can be improved.

Figure 34:
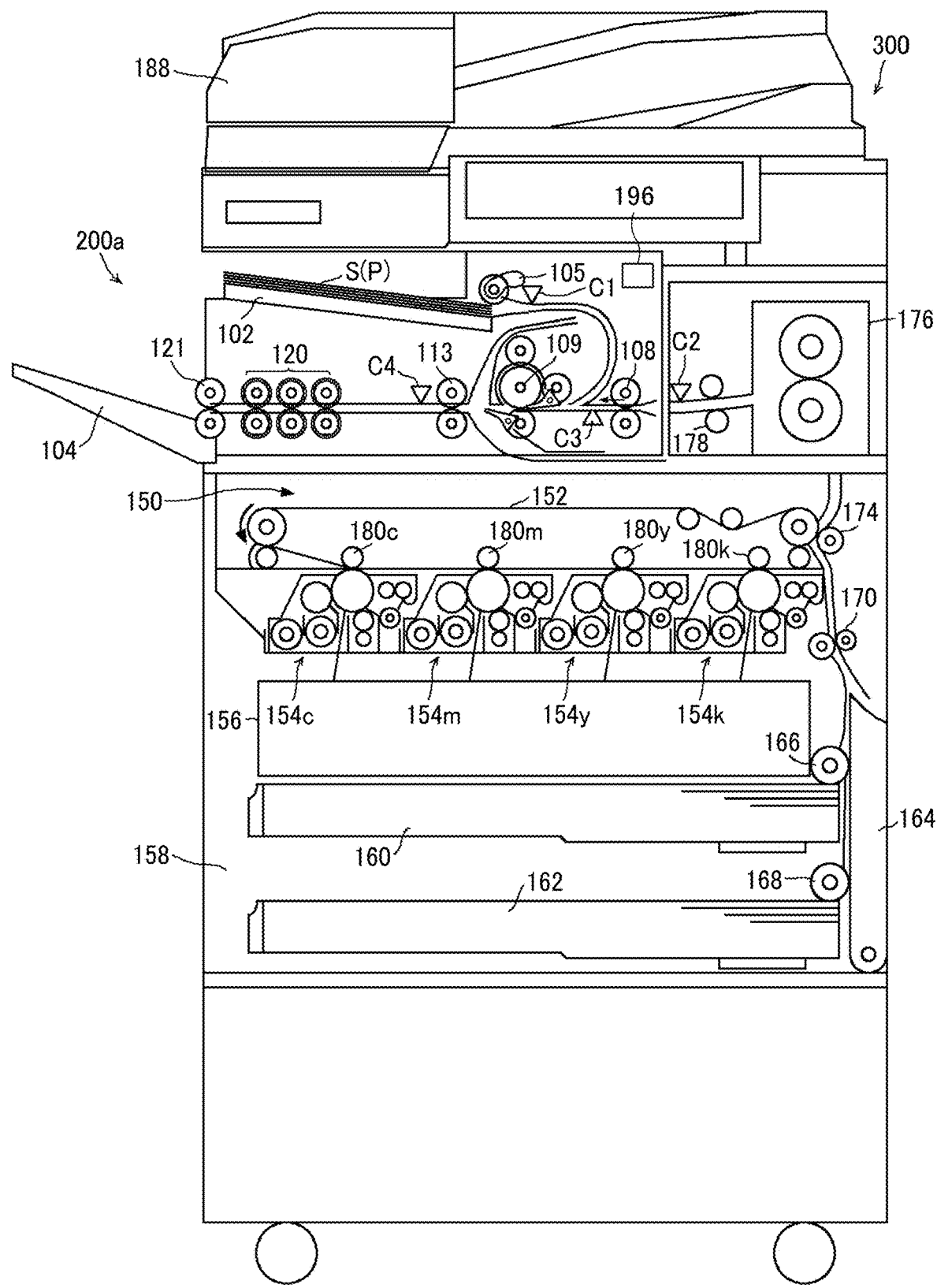
FIG. 34 is a view illustrating an example of general arrangement of an image forming apparatus including the laminator according to one embodiment.

FIG. 34 is a view illustrating an example of general arrangement of an image forming apparatus including the laminator according to one embodiment of the present disclosure. An image forming apparatus 300 illustrated in FIG. 34 includes a laminator 200a to perform a laminating process.

The laminator 200a includes the sheet tray 102 on which lamination sheets S or insertion sheets P are stacked. Additionally, the laminator 200a can receive at least one of the lamination sheets S and the insertion sheets P fed from the image forming apparatus 300. Therefore, an image can be added in-line on the lamination sheet S or the insertion sheet P by the image forming apparatus 300 (for example, a printer or a copier).

The configuration of the image forming apparatus 300 is described in detail. As illustrated in FIG. 34, an intermediate transfer device 150 is disposed in the main body of the image forming apparatus 300. The intermediate transfer device 150 includes an endless intermediate transfer belt 152 entrained around a plurality of rollers and stretched almost horizontally. The intermediate transfer belt 152 rotates counterclockwise in the drawing.

Image forming devices 154c, 154m, 154y, and 154k are arranged side by side along and below the intermediate transfer belt 152 of the intermediate transfer device 150, in that order in a direction in which the intermediate transfer belt 152 is rotated. The image forming devices 154c, 154m, 154y, and 154k form toner images of cyan, magenta, yellow, and black, respectively. Each of the image forming devices 154c, 154m, 154y, and 154k includes a drum-shaped image bearer that rotates clockwise in the drawing. Around the image bearer, a charging device, a developing device, a transfer device, and a cleaning device are disposed. Below each image forming device 154, an exposure device 156 is disposed.

Below the exposure device 156, a sheet feeder 158 is disposed. The sheet feeder 158 includes a first sheet feeding tray 160 that stores lamination sheets S and a second sheet feeding tray 162 that stores insertion sheets P. The first sheet feeding tray 160 is an example of a two-ply sheet tray on which two-ply sheets are stacked, and the second sheet feeding tray 162 is an example of a medium tray on which sheet-like media are stacked.

A first sheet feeding roller 166 is disposed at the upper right of the first sheet feeding tray 160 and feeds the lamination sheets S from the first sheet feeding tray 160 one by one to a sheet feeding passage 164. A second sheet feeding roller 168 is disposed at the upper right of the second sheet feeding tray 162 and feeds the insertion sheets P from the second sheet feeding tray 162 one by one to the sheet feeding passage 164.

The sheet feeding passage 164 extends from the lower side to the upper side on the right side in the main body of the image forming apparatus 300 and communicates with the laminator 200a inside the image forming apparatus 300.

The sheet feeding passage 164 is provided with a conveyance roller 170, a secondary transfer device 174 disposed opposite the intermediate transfer belt 152, a fixing device 176, a sheet ejection device 178 including an ejection roller pair, and the like in order.

The first sheet feeding roller 166, the conveyance roller 170, and the sheet feeding passage 164 are examples of a two-ply sheet feeder that feeds a two-ply sheet from the first sheet feeding tray 160 (the two-ply sheet tray). The second sheet feeding roller 168, the conveyance roller 170, and the sheet feeding passage 164 are examples of a medium feeder that feeds a sheet medium from the second sheet feeding tray 162 (the medium tray). The intermediate transfer device 150, the fixing device 176, and the like are examples of an image forming device that forms an image on a two-ply sheet or a sheet medium.

Next, a description is given of an operation of forming an image on the lamination sheet S and then performing lamination in the image forming apparatus 300 according to the present embodiment.

To form an image on the lamination sheet S, first, an image reading device 188 reads a document image, and the exposure device 156 performs image writing. Next, the image forming devices 154c, 154m, 154y, and 154k form respective color toner images on the image bearers thereof. Then, primary transfer devices 180c, 180m, 180y, and 180k sequentially transfer the toner images onto the intermediate transfer belt 152, thereby forming a color image formed thereon.

By contrast, the image forming apparatus 300 rotates the first sheet feeding roller 166 to feed the lamination sheet S to the sheet feeding passage 164. Then, the lamination sheet S is conveyed by the conveyance roller 170 through the sheet feeding passage 164 and sent to a secondary transfer position, timed to coincide with the color image on the intermediate transfer belt 152. Then, the secondary transfer device 174 transfers the color image formed on the intermediate transfer belt 152 as described above onto the lamination sheet S.

After the image transfer, the fixing device 176 fixes the image on the lamination sheet S, and the sheet ejection device 178 sends the lamination sheet S to the laminator 200a.

Further, the image forming apparatus 300 rotates the second sheet feeding roller 168 to feed the insertion sheet P to the sheet feeding passage 164, and the sheet ejection device 178 sends the insertion sheet P to the laminator 200a.

In this way, the lamination sheet S on which the image has been formed and the insertion sheet P are sent to the laminator 200a, and a laminating process is performed. The details of the laminating process have been described above and redundant descriptions are omitted.

With the above-described configuration, the image forming apparatus 300 according to the present embodiment can perform the laminating process with the laminator 200a after image formation on the insertion sheet P. In addition, the image forming apparatus 300 can perform the laminating process after image formation on both the insertion sheet P and the lamination sheet S.

Figure 35:
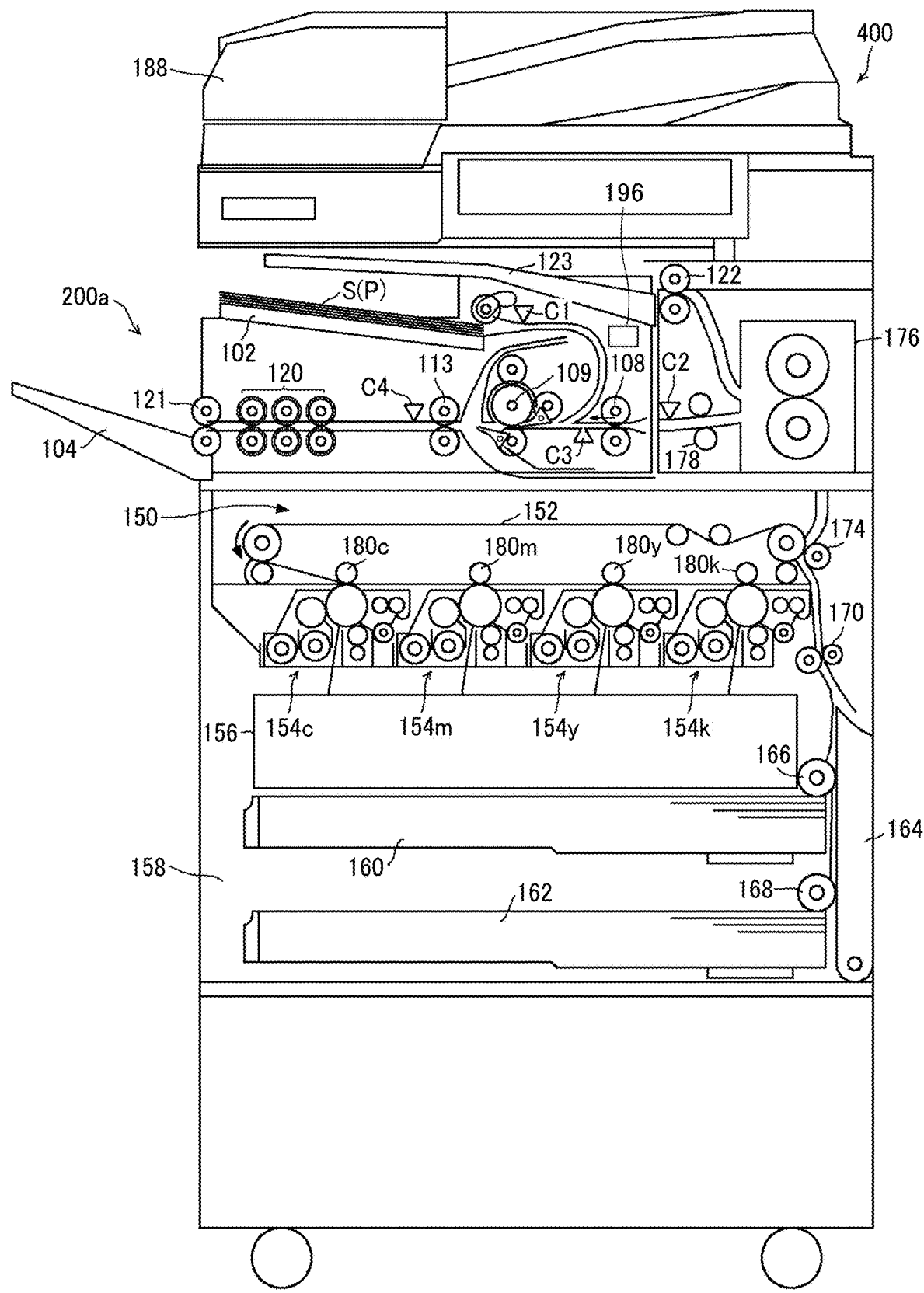
FIG. 35 is a view illustrating general arrangement of an image forming apparatus including the laminator according to a variation.

FIG. 35 is a view illustrating general arrangement of a variation of the image forming apparatus including the laminator according to one embodiment of the present disclosure. Differently from the image forming apparatus 300 illustrated in FIG. 34, a main body of an image forming apparatus 400 includes an ejection roller pair 122 and an output tray 123.

When the laminating process is not performed, the image forming apparatus 400 can eject the recording medium on which the image is formed using the ejection roller pair 122 of the main body to the output tray 123 of the main body. Therefore, the image forming apparatus 400 does not decrease the image output speed when the laminating process is not performed.

The laminator 200a can be removably installed inside the image forming apparatus 400. That is, when the laminating process is unnecessary, the laminator 200a can be removed from the image forming apparatus 400.

In addition, the laminator 200a can adapt to the following configuration. The sheet feeding tray 103 on which the insertion sheets P are stacked and the pickup roller 106 to feed the insertion sheets P from the sheet feeding tray 103 are mounted in the removed laminator 200a, so that the laminator 200a is used as a stand-alone machine similar to that illustrated in FIG. 33.

The image forming apparatus 300 illustrated in FIG. 34 and the image forming apparatus 400 illustrated in FIG. 35 can include a sheet separation device instead of the laminator. The image forming apparatus 400 illustrated in FIG. 35 can include a sheet separation device that is removably mounted.

Further, aspects of this disclosure can be embodied as an image forming system that includes an image forming apparatus and one of the sheet separation devices 100a to 100f, or the laminator 200 detachably coupled to the image forming apparatus. Furthermore, aspects of this disclosure can be embodied as a system including at least one of a sheet feeder (a stacker) and a case binding device. Note that, in the case where the lamination sheet S is passed through the fixing device 176, the lamination sheet S is not bonded at the fixing temperature, but is bonded by application of heat higher than the fixing temperature.

Although the image forming apparatuses 300 and 400 employ electrophotography for image formation on the lamination sheet S and the insertion sheet P in the description above, the image formation method is not limited thereto, and inkjet, screen printing, or other printing method can be used.

The embodiments of the present disclosure has been described in detail above. Numerous additional modifications to the above-described embodiment and variations are possible. It is therefore to be understood that, within the scope of the appended claims, the disclosure of this patent specification may be practiced otherwise than as specifically described herein. For example, the embodiments and the modifications may be combined. The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A sheet separation device configured to separate a two-ply sheet in which two sheets are bonded together at a portion of the two-ply sheet, the sheet separation device comprising:
   a rotator including a holder configured to hold the two-ply sheet;
   the holder configured to hold the two-ply sheet around the rotator to create a difference in winding circumferential length between the two sheets of the two-ply sheet as the rotator rotates, to separate the two-ply sheet;
   a conveyor configured to convey the two-ply sheet to the holder, with a bonded portion of the two-ply sheet being an upstream end or a downstream end of the two-ply sheet in a conveyance direction of the two-ply sheet; and
   control circuitry configured to adjust a winding amount of the two-ply sheet around the rotator.

2. The sheet separation device according to claim 1, wherein the control circuitry is configured to:
   acquire information on the two-ply sheet; and
   adjust the winding amount of the two-ply sheet in accordance with the information on the two-ply sheet.

3. The sheet separation device according to claim 2, wherein the information on the two-ply sheet includes at least one of a size, a thickness, and a material of the two-ply sheet.

4. The sheet separation device according to claim 1, further comprising a sheet end sensor being upstream from the conveyor in the conveyance direction in which the conveyor conveys the two-ply sheet toward the rotator, the sheet end sensor configured to detect an end of the two-ply sheet in the conveyance direction,
   wherein the control circuitry is configured to adjust the winding amount of the two-ply sheet in accordance with a detection result generated by the sheet end sensor.

5. The sheet separation device according to claim 1, further comprising a distance sensor being between the rotator and the conveyor in the conveyance direction, the distance sensor configured to detect a distance to a surface of the two-ply sheet,
   wherein the control circuitry is configured to adjust the winding amount of the two-ply sheet in accordance with a detection result generated by the distance sensor.

6. The sheet separation device according to claim 1, wherein the conveyor is configured to convey the two-ply sheet in both a direction toward the rotator and a reverse direction retracting from the rotator.

7. The sheet separation device according to claim 6, wherein, in winding the two-ply sheet around the rotator, the rotator winds the two-ply sheet with the bonded portion of the two-ply sheet being the upstream end in the conveyance direction in which the conveyor conveys the two-ply sheet toward the rotator.

8. The sheet separation device according to claim 7, further comprising a separation claw disposed between the rotator and the conveyor in the conveyance direction and configured to move in a width direction of the two-ply sheet,
   wherein the control circuitry is configured to:
      insert, in the width direction, the separation claw into a space between the two sheets of the two-ply sheet; and
      cause the conveyor to convey the two-ply sheet in the reverse direction retracting from the rotator with the separation claw inserted in the space, to separate the two sheets of the two-ply sheet.

9. The sheet separation device according to claim 8, further comprising a sheet guide configured to guide the separated two sheets of the two-ply sheet to different passages,
   wherein the conveyor is configured to convey the separated two sheets to the sheet guide, to open the two-ply sheet.

10. The sheet separation device according to claim 9, further comprising:
    a first stacking tray configured to store the two-ply sheet;
    a first feeder configured to feed the two-ply sheet from the first stacking tray to the conveyor;
    a second stacking tray configured to store a sheet medium to be inserted into the two-ply sheet; and
    a second feeder configured to feed, from the second stacking tray, the sheet medium into the two-ply sheet.

11. A laminator comprising:
    the sheet separation device according to claim 1; and
    a heat and pressure member configured to heat and press the two sheets of the two-ply sheet.

12. An image forming apparatus comprising:
    a two-ply sheet tray configured to store the two-ply sheet;
    a two-ply sheet feeder configured to feed the two-ply sheet from the two-ply sheet tray;
    an image forming device configured to form an image on the two-ply sheet; and
    the sheet separation device according to claim 1, to separate the two sheets of the two-ply sheet.

13. The image forming apparatus according to claim 12, further comprising a laminator including:
    the sheet separation device; and
    a heat and pressure member configured to heat and press the two-ply sheet.

14. The image forming apparatus according to claim 12, further comprising:
    a medium tray configured to store a sheet medium;
    a medium feeder configured to feed the sheet medium from the medium tray; and
    an image forming device configured to form an image on the sheet medium,
    wherein the sheet separation device is configured to insert, into the two-ply sheet, the sheet medium on which the image is formed.

15. An image forming apparatus comprising:
    a medium tray configured to store a sheet medium;
    a medium feeder configured to feed the sheet medium from the medium tray;
    an image forming device configured to form an image on the sheet medium; and
    the sheet separation device according to claim 1, configured to separate the two sheets of the two-ply sheet and insert, into the two-ply sheet, the sheet medium on which the image is formed.

16. The image forming apparatus according to claim 15, further comprising a laminator including:
    the sheet separation device; and
    a heat and pressure member configured to heat and press the two-ply sheet.

17. An image forming system comprising:
    an image forming apparatus; and
    the sheet separation device according to claim 1, removably coupled to the image forming apparatus.

18. The image forming system according to claim 17, further comprising a laminator including:
    the sheet separation device; and a heat and pressure member configured to heat and press the two-ply sheet.

19. A sheet separation device configured to separate a two-ply sheet in which two sheets are bonded together at a portion of the two-ply sheet, the sheet separation device comprising:
a conveyor configured to convey the two-ply sheet toward a nip between winding members, with a bonded portion of the two-ply sheet being an upstream end or a downstream end of the two-ply sheet in a conveyance direction of the two-ply sheet;
the winding members, configured to wind the two-ply sheet around one of the winding members, to create a difference in winding circumferential length between the two sheets and to separate the two-ply sheet; and
control circuitry configured to adjust a winding amount of the two-ply sheet around one of the winding members.

20. The sheet separation device according to claim 19, wherein the control circuitry is configured to:
acquire information on the two-ply sheet; and
adjust the winding amount of the two-ply sheet in accordance with the information on the two-ply sheet.

\* \* \* \* \*